United States Patent
Zhang et al.

(10) Patent No.: US 11,304,175 B2
(45) Date of Patent: Apr. 12, 2022

(54) WIRELESS DEVICE, NETWORK NODE AND METHODS THEREIN FOR REPORTING A MEASUREMENT

(71) Applicant: Telefonaktiebolaget LM Ericsson (publ), Stockholm (SE)

(72) Inventors: Xin Zhang, Unterhaching (DE); Fredrik Gunnarsson, Linköping (SE); Sara Modarres Razavi, Linköping (SE); Henrik Rydén, Solna (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/624,041

(22) PCT Filed: Aug. 10, 2018

(86) PCT No.: PCT/SE2018/050813
§ 371 (c)(1),
(2) Date: Dec. 18, 2019

(87) PCT Pub. No.: WO2019/032036
PCT Pub. Date: Feb. 14, 2019

(65) Prior Publication Data
US 2020/0322915 A1    Oct. 8, 2020

Related U.S. Application Data

(60) Provisional application No. 62/564,413, filed on Sep. 28, 2017, provisional application No. 62/544,237, filed on Aug. 11, 2017.

(30) Foreign Application Priority Data
Jun. 27, 2018    (WO) .................. PCT/SE2018/050695

(51) Int. Cl.
*H04W 64/00* (2009.01)
*G01S 5/00* (2006.01)
(Continued)

(52) U.S. Cl.
CPC ......... *H04W 64/006* (2013.01); *G01S 5/0036* (2013.01); *G01S 19/04* (2013.01);
(Continued)

(58) Field of Classification Search
CPC ..... H04W 64/006; H04W 8/24; H04W 24/10; G01S 5/0036; G01S 19/04; G01S 19/05; G01S 19/09
See application file for complete search history.

(56) References Cited

U.S. PATENT DOCUMENTS

| 4,812,991 A | 3/1989 | Hatch |
| 4,963,889 A | 10/1990 | Hatch |

(Continued)

FOREIGN PATENT DOCUMENTS

| WO | 2017051384 A1 | 3/2017 | |
| WO | WO-2017051384 A1 * | 3/2017 | ............ H04W 24/10 |

OTHER PUBLICATIONS

Montenbruck, Oliver, "Annex A: Data Formats", XP-002786423, 2017, pp. 1-28.
(Continued)

*Primary Examiner* — Khai M Nguyen
(74) *Attorney, Agent, or Firm* — Murphy, Bilak & Homiller, PLLC

(57) ABSTRACT

A method, performed by a wireless device (120), for reporting at least one measurement to a network node (130) is disclosed. The wireless device (120) determines (420) an extended format to be used for reporting, to the network node (130), at least one of: a code phase measurement, a carrier phase measurement or a GNSS Signal ID. The
(Continued)

extended format extends at least one of: a range or a resolution, of an existing format for reporting the at least one of: the code phase measurement, the carrier phase measurement or the GNSS Signal ID. The wireless device (120) then sends (430) a measurement report comprising the at least one of: the code phase measurement, the carrier phase measurement or the GNSS Signal ID, to the network node (130), using the determined extended format. A method performed by the network node (130) is also described, whereby the network node (130) receives the measurement report.

22 Claims, 13 Drawing Sheets

(51) Int. Cl.
  *G01S 19/04* (2010.01)
  *G01S 19/05* (2010.01)
  *G01S 19/09* (2010.01)
  *H04W 8/24* (2009.01)
  *H04W 24/10* (2009.01)
(52) U.S. Cl.
  CPC .............. *G01S 19/05* (2013.01); *G01S 19/09* (2013.01); *H04W 8/24* (2013.01); *H04W 24/10* (2013.01)

(56) References Cited

U.S. PATENT DOCUMENTS

| | | | |
|---|---|---|---|
| 5,072,227 A | 12/1991 | Hatch | |
| 5,148,179 A | 9/1992 | Allison | |
| 5,177,489 A | 1/1993 | Hatch | |
| 5,471,217 A | 11/1995 | Hatch et al. | |
| 5,583,513 A | 12/1996 | Cohen | |
| 5,899,957 A | 5/1999 | Loomis | |
| 5,917,445 A | 6/1999 | Schipper et al. | |
| 6,198,430 B1 | 3/2001 | Hwang et al. | |
| 6,266,009 B1 | 7/2001 | Hwang | |
| 6,281,841 B1 | 8/2001 | Nevill | |
| 6,567,041 B1* | 5/2003 | O'Dell | G01S 5/009 342/357.44 |
| 6,584,404 B1 | 6/2003 | McBurney et al. | |
| 7,117,417 B2 | 10/2006 | Sharpe et al. | |
| 7,570,204 B1 | 8/2009 | McGraw | |
| 10,890,665 B2* | 1/2021 | Modarres Razavi | G01R 19/02 |
| 2002/0024461 A1* | 2/2002 | Moeglein | H03J 7/047 342/357.42 |
| 2007/0052583 A1 | 3/2007 | Zhodzishsky et al. | |
| 2008/0234980 A1* | 9/2008 | Wirola | G01S 19/04 702/189 |
| 2012/0024461 A1* | 2/2012 | Gottmann | H01M 4/8885 156/89.12 |
| 2013/0324154 A1* | 12/2013 | Raghupathy | G01S 19/42 455/456.1 |
| 2019/0020431 A1* | 1/2019 | Chae | H04W 76/14 |
| 2019/0104431 A1* | 4/2019 | Gunnarsson | H04W 64/00 |

OTHER PUBLICATIONS

Unknown, Author, "3rd Generation Partnership Project; Technical Specification Group Radio Access Network Evolved Universal Terrestrial Radio Access (E-UTRA); LTE Positioning Protocol (LPP) (Release 14)", 3GPP TS 36.355 V14.2.0, Jun. 2017, pp. 1-167.

Unknown, Author, "3rd Generation Partnership Project; Technical Specification Group Radio Access Network Evolved Universal Terrestrial Radio Access Network (E-UTRAN); Stage 2 functional specification of User Equipment (UE) positioning in E-UTRAN (Release 14)", 3GPP TS 36.305 V14.1.0, Mar. 2017, pp. 1-78.

Unknown, Author, "Differential GNSS (Global Navigation Satellite Systems) Services—Version 3", RTCM Standard 10403.3, Oct. 7, 2016, pp. 1-285.

Unknown, Author, "LTE; Evolved Universal Terrestrial Radio Access (E-UTRA); LTE Positioning Protocol (LPP)", ETSI TS 136 355 V14.2.0, Jul. 2017, pp. 1-170.

Unknown, Author, "LTE; Evolved Universal Terrestrial Radio Access Network (E-UTRAN); Stage 2 functional specification of User Equipment (UE) positioning in E-UTRAN", ETSI TS 136 305 V14.2.0, Jul. 2017, pp. 1-81.

"On Remaining Issues of GNSS RTK Information via LPP", 3GPP TSG-RAN WG2#101bis; R2-1805259; Sanya, China, Apr. 16-20, 2018, pp. 1-10.

"RINEX The Receiver Inependent Exchange Format", International GNSS Service (IGS), RINEX Working Group and Radio Technical Commission for Maritime Services Special Committee 104 (RTCM-SC104), Version 3.03, Jul. 14, 2015, pp. 1-95.

Misra, P., et al., "Global Positioning System: Signals, Measurements, and Performance", revised second edition; section 7.4.1; Ganga-Jamuna Press, Lincoln, MA, USA; copyright in the year 2012. ISBN 978-0-97095442-8, 2012, pp. 251-253.

O'Driscoll, Cillian, "GNSS Solutions: Carrier phase and its measurement for GNSS", Inside GNSS, www.insidegnss, Jul.-Aug. 2010, pp. 18-22.

"3GPP TS 36.214 V14.2.0", 3rd Generation Partnership Project; Technical Specification Group Radio Access Network; Evolved Universal Terrestrial Radio Access (E-UTRA); Physical layer; Measurements (Release 14), Mar. 2017, pp. 1-22.

"On measurements for UE-assisted GNSS RTK positioning", 3GPP TSG RAN1 Meeting #90; R1-1713314; Prague, Czech Republic, Aug. 21-25, 2017, pp. 1-4.

* cited by examiner

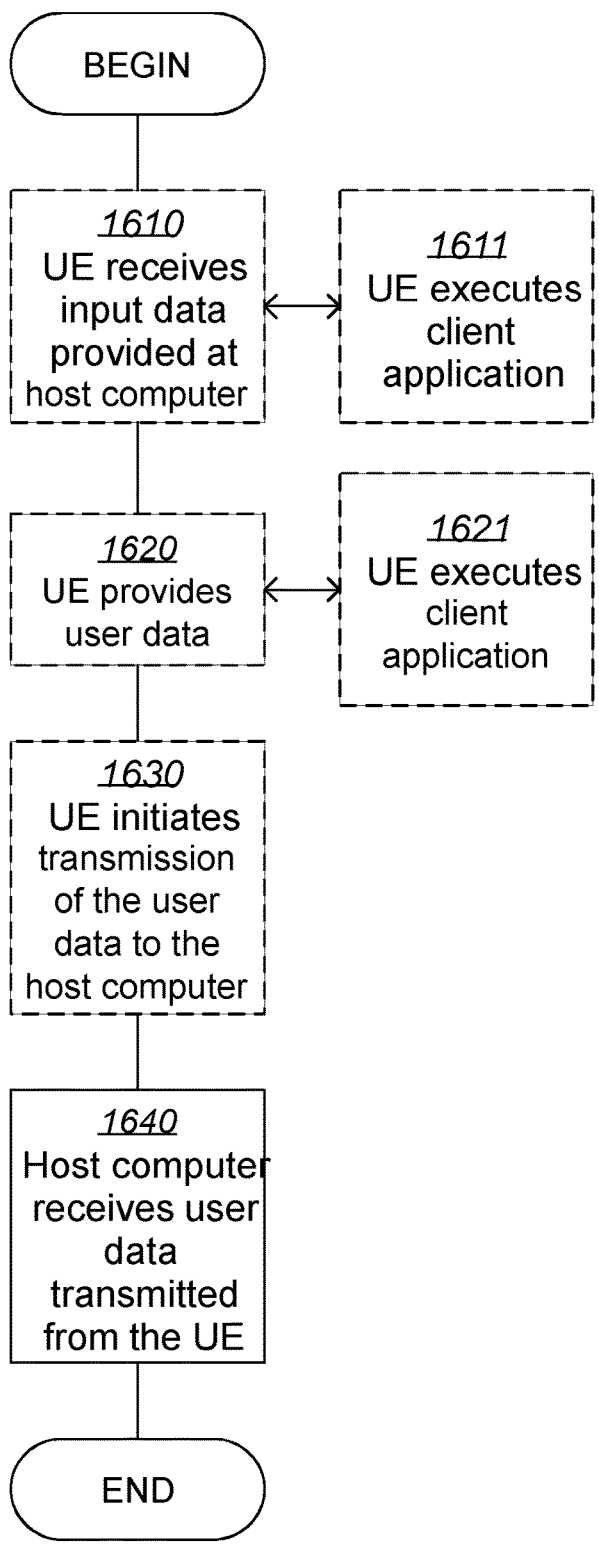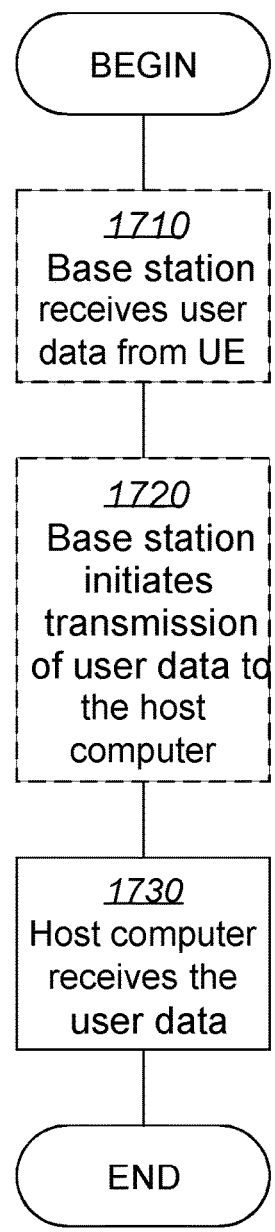
FIG. 16
FIG. 17

WIRELESS DEVICE, NETWORK NODE AND METHODS THEREIN FOR REPORTING A MEASUREMENT

TECHNICAL FIELD

The present disclosure relates generally to a wireless device, and methods performed thereby, reporting at least one measurement to a network node, such as located server. The present disclosure also relates generally to the network node and methods performed thereby for the handling the reporting of the at least one measurement.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Positioning

Positioning in LTE may be supported by the architecture in in FIG. 1, with direct interactions between a UE 10 and a location server, the Evolved Serving Mobile Location Center (E-SMLC) 11, via the LTE Positioning Protocol (LPP) 12. Moreover, there may be also interactions between the location server and the eNodeB 13 via the LTE Positioning Protocol A (LPPa) protocol 14, to some extent supported by interactions between the eNodeB 13 and the UE 10 via the Radio Resource Control (RRC) protocol 15. The eNodeB 40 and the E-SMLC 20 may also communicate with a Mobility Management Entity (MME) 16, which in turn communicates with a Gateway Mobile Location Centre (GMLC) 17.

The eNodeB 13 may be understood to operate in a radio communications network, providing radio coverage over a geographical area which radio coverage may also be referred to as a beam or a beam group of a first radio access technology (RAT), such as 5G, LTE, Wi-Fi, NB-IoT, CAT-M, Wi-Fi, eMTC or similar. The eNodeB 13 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point or any other network unit capable of communicating with a wireless device within the service area served by the eNodeB 13 depending e.g. on the radio access technology and terminology used. The eNodeB 13 may be referred to as a serving radio network node and may be understood to communicate with a wireless device, such as the UE 10, with Downlink (DL) transmissions to the wireless device and Uplink (UL) transmissions from the wireless device.

In LTE, as described e.g., in 3GPP Technical Specification 36.305, v.14.1.0, the following positioning techniques may be considered. A first technique is the Enhanced Cell Identifier (ID). Through this technique, cell ID information may be used to associate the UE to the serving area of a serving cell, and then additional information may be used to determine a finer granularity position.

Another technique is assisted Global Navigation Satellite System (GNSS). GNSS may be understood to encompass all systems that may provide worldwide positioning based on satellites, including, for example, the Global Positioning System (GPS), the Global Navigation Satellite System (GLONASS) and Galileo. In this technique, GNSS information may be retrieved by the UE, and it may be supported by assistance information provided to the UE from the Evolved Serving Mobile Location Center (E-SMLC).

Another technique is the Observed Time Difference of Arrival (OTDOA). In this technique, the UE may estimate the time difference of reference signals from different base stations and may send the result of the estimation to the E-SMLC for multilateration.

Yet another technique is the Uplink TDOA (UTDOA). In this technique, the UE may be requested to transmit a specific waveform that may be detected by multiple location measurement units, e.g., an eNB, at known positions. These measurements may be forwarded to E-SMLC for multilateration.

In LTE, 3$^{rd}$ Generation Partnership Project, 3GPP, Rel. 15 positioning WI, one main objective is to provide support for Real Time Kinematics (RTK) GNSS positioning. It has been also agreed that both UE-based and UE-assisted RTK GNSS positioning would be supported. In case of UE-assisted RTK GNSS, the UE may be required to send appropriate satellite signalling measurements to the location server in order to allow the network to provide high accuracy positioning estimations. UE-based RTK GNSS positioning may be understood as a method in which the UE may only receive the RTK GNSS correction data from the network, e.g., the E-SMLC, and may and obtain the positioning fix based on the GNSS receiver and the correction data by itself.

A GNSS receiver may determine the travel time of a signal from a satellite by comparing a "pseudo random code" it may be generating, with an identical code in the signal from the satellite. The receiver may "slide" its code later and later in time until it syncs up with the code of the satellite. The amount it may be required to slide the code until it syncs up with the code of the satellite may be understood to be equal to the travel time of the signal. One problem is that the bits, or cycles, of the pseudo random code are so wide they are not perfectly synced. The resolution of one pulse in the code is low, meaning that it can be in the range of meters and not more accurate than that. As a result, code measurements may be precise to the meter level.

The carrier phase measurement is a measure of the range, that is, the distance, between a satellite and a receiver expressed in units of cycles of the carrier frequency. This measurement may be made with very high precision, e.g., of the order of millimeters, but the whole number of cycles between satellite and receiver may not be measurable. It may not be possible to interpret the carrier phase measurement without having the code phase measurement. That it, it may not be a standalone measure.

FIG. 2 is a schematic diagram illustrating a comparison of the carrier-phase and code measurements. As it is observable in the figure, the carrier frequency is hard to count because it is so uniform. Every cycle looks the same. The pseudo random code, on the other hand, is intentionally complex to make it easier to become distinguishable. That is, the code phase measurement may be understood to be easier to be correctly received due to its digital shape. However, the code phase measurement may have a much lower accuracy than the carrier phase measurement, as depicted in the example of the Figure, wherein the scale for the carrier phase measurement is in the order of centimeters, 19 cm for the carrier wavelength for L1, while that of the code phase measurement is in the order of meters, 293 m for the coarse acquisition C/A chip length. Therefore, to efficiently exploit the carrier-phase measurement, it may be considered preferable to use the code-phase measurement to get close to some level of accuracy and have only few wavelengths of carrier to determine which cycle really marks the exact timing pulse.

Existing positioning methods may result in positioning results with margins of error that may be significant enough to render them useless for their intended purpose.

SUMMARY

An object of embodiments herein is to improve the performance of a wireless communications network. Particularly, it is an object of embodiments herein to improve positioning methods in a wireless communications network.

According to a first aspect of embodiments herein, the object is achieved by a method, performed by a wireless device. The method is for reporting at least one measurement to a network node. The wireless device and the network node operate in a wireless communications network. The wireless device determines an extended format to be used for reporting, to the network node, at least one of: a code phase measurement, a carrier phase measurement or a GNSS Signal Identifier (ID). The extended format extends at least one of: a range or a resolution, of an existing format for reporting, to the network node, the at least one of: the code phase measurement, the carrier phase measurement or the GNSS Signal ID. The wireless device also sends a measurement report comprising the at least one of: the code phase measurement, the carrier phase measurement or the GNSS Signal ID, to the network node 130, using the determined extended format.

According to a second aspect of embodiments herein, the object is achieved by a method, performed by a network node, for handling a report of at least one measurement from the wireless device. The wireless device and the network node operate in the wireless communications network. The network node receives, from the wireless device, a measurement report comprising at least one of: a code phase measurement, a carrier phase measurement or a GNSS Signal ID, using the extended format. The extended format extends the at least one of: the range or the resolution, of the existing format for reporting, to the network node, the at least one of: the code phase measurement, the carrier phase measurement or the GNSS Signal ID.

According to a third aspect of embodiments herein, the object is achieved by a wireless device, configured to report at least one measurement to a network node. The wireless device and the network node are configured to operate in the wireless communications network. The wireless device is further configured to determine the extended format to be used for reporting, to the network node, at least one of: the code phase measurement, the carrier phase measurement or the GNSS Signal ID. The extended format is configured to extend at least one of: the range or the resolution, of the existing format for reporting, to the network node, the at least one of: the code phase measurement, the carrier phase measurement or the GNSS Signal ID. The wireless device is further configured to send the measurement report comprising the at least one of: the code phase measurement, the carrier phase measurement or the GNSS Signal ID, to the network node, using the extended format configured to be determined.

According to a fourth aspect of embodiments herein, the object is achieved by a network node, configured to handle a report of at least one measurement from a wireless device. The wireless device and the network node are configured to operate in the wireless communications network. The network node is further configured to receive, from the wireless device, the measurement report comprising at least one of: the code phase measurement, the carrier phase measurement or the GNSS Signal ID, using the extended format. The extended format is configured to extend at least one of: the range or the resolution, of the existing format for reporting, to the network node, the at least one of: the code phase measurement, the carrier phase measurement or the GNSS Signal ID.

By determining the extended format, the wireless device may be enabled to more flexibly decide the extended format to be used for the reporting. The determining may be based on one or more criteria. For example, the wireless device may determine an appropriate representation of measurement with the extended format based on the estimated accuracy of the measurement. That is, there may be instances wherein the wireless device may consider that there may be some reasons for having a relatively large measurement error. In such instances, the wireless device may consider that there is no need for example to report with the extended format. Therefore, the wireless device may save power as well processing and time-frequency resources, optimizing the signaling procedure while allowing for an increase in the resolution. Further advantages of embodiments herein are described below.

BRIEF DESCRIPTION OF THE DRAWINGS

Examples of embodiments herein are described in more detail with reference to the accompanying drawings, according to the following description.

FIG. 16 is a flowchart depicting embodiments of a method in a communications system including a host computer, a base station and a user equipment, according to embodiments herein.

FIG. 17 is a flowchart depicting embodiments of a method in a communications system including a host computer, a base station and a user equipment, according to embodiments herein.

DETAILED DESCRIPTION

As a part of developing embodiments herein, a problem of the existing methods will first be identified and discussed.

The accuracy of GNSS measurements depends on the resolution of the measurement reports for UE code phase measurement and also the availability of carrier phase measurement. Current proposals aim at providing higher resolution and extension of the measurements. However, how to support these proposals, e.g., in a specification, is unknown.

While UE-based RTK GNSS may be getting supported by having RTK GNSS network data broadcasted to the UEs, it is also possible to consider that UEs may send their code and carrier phase measurements for each satellite to the location server via LPP, and then the location server that may already contain the RTK network correction data may provide the more accurate RTK GNSS positioning to the UE.

In UE-assisted RTK GNSS, the UE may send its code and carrier phase measurements for each satellite to the location server, e.g., E-SMLC, and then the location server that may already contain the RTK network correction data may provide the more accurate RTK GNSS positioning to the UE. There are already code and carrier phase measurements defined for the UE and reported to the location server. Therefore, the UE-assisted RTK GNSS method has already some support in the signalling. However due to a higher resolution of RTK observation data, this reporting structure is not suitable any longer and needs major modification.

Embodiments herein address this problem of the existing methods. In developing embodiments herein, a number of observations have been made. To be forward compatible, the resolutions of the current UE RTK measurement fields are required to be improved. However, an observation is that it may be necessary to maintain backward compatibility at the same time, such that, an old device may still be able to communicate with the new signalling support. Another observation is that the extension of the signalling may need to be applied such that minimum addition of bits would be required and the previous measurement parameter may be still useful with the new more capable devices.

The embodiments herein aim to provide a backward compatible solution with the minimum addition of bit transmission in order to increase the resolution of the UE measurements for an improved UE-assisted RTK GNSS positioning estimation. Embodiments herein may be understood to relate to methods and apparatus in a global navigation system.

Several embodiments and examples are comprised herein. It should be noted that the embodiments and/or examples herein are not mutually exclusive. Components from one embodiment or example may be tacitly assumed to be present in another embodiment or example and it will be obvious to a person skilled in the art how those components may be used in the other exemplary embodiments and/or examples.

Figure 1:
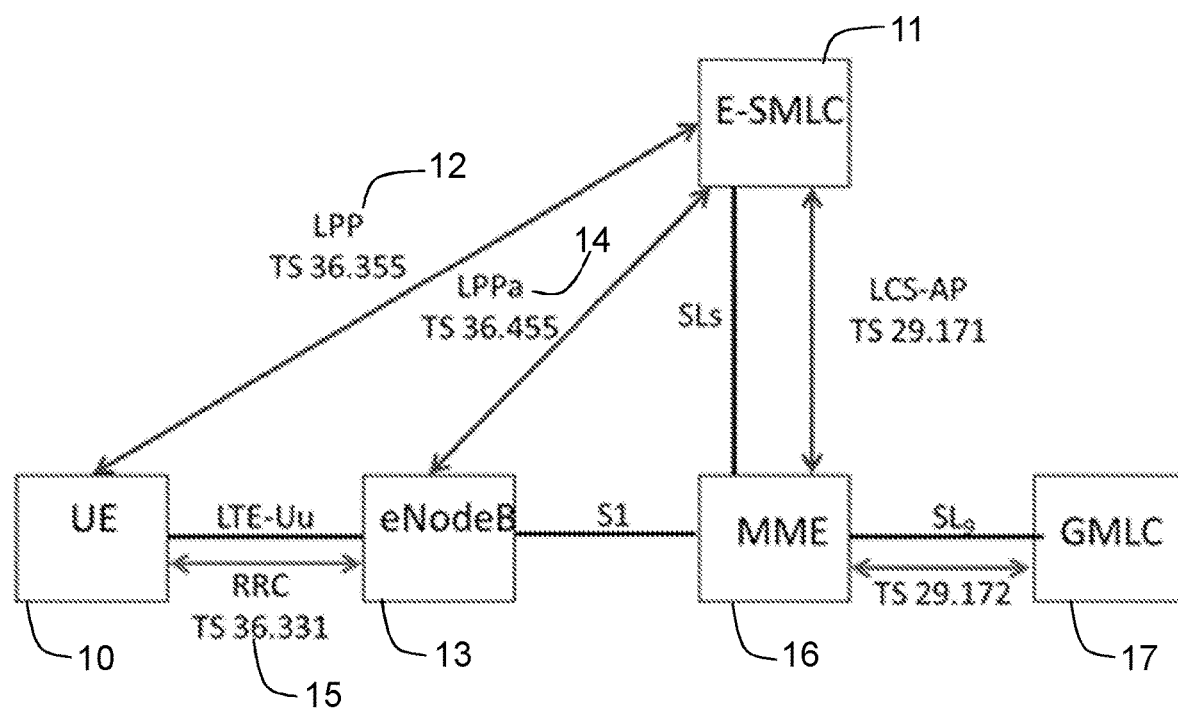
FIG. 1 is a schematic diagram illustrating an LTE positioning architecture.
Figure 2:
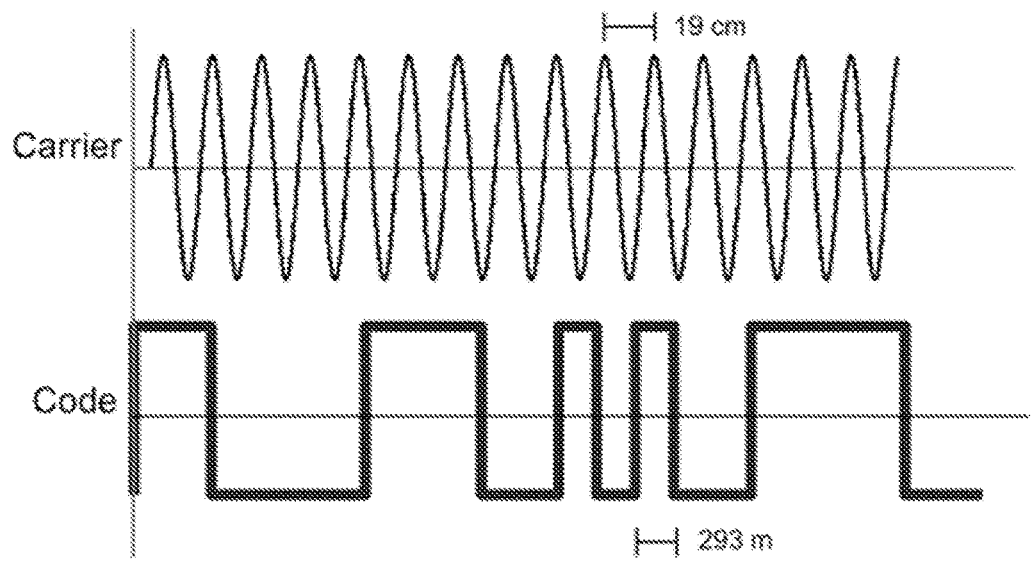
FIG. 2 is a schematic diagram illustrating a comparison of the carrier-phase and code measurements.
Figure 3:
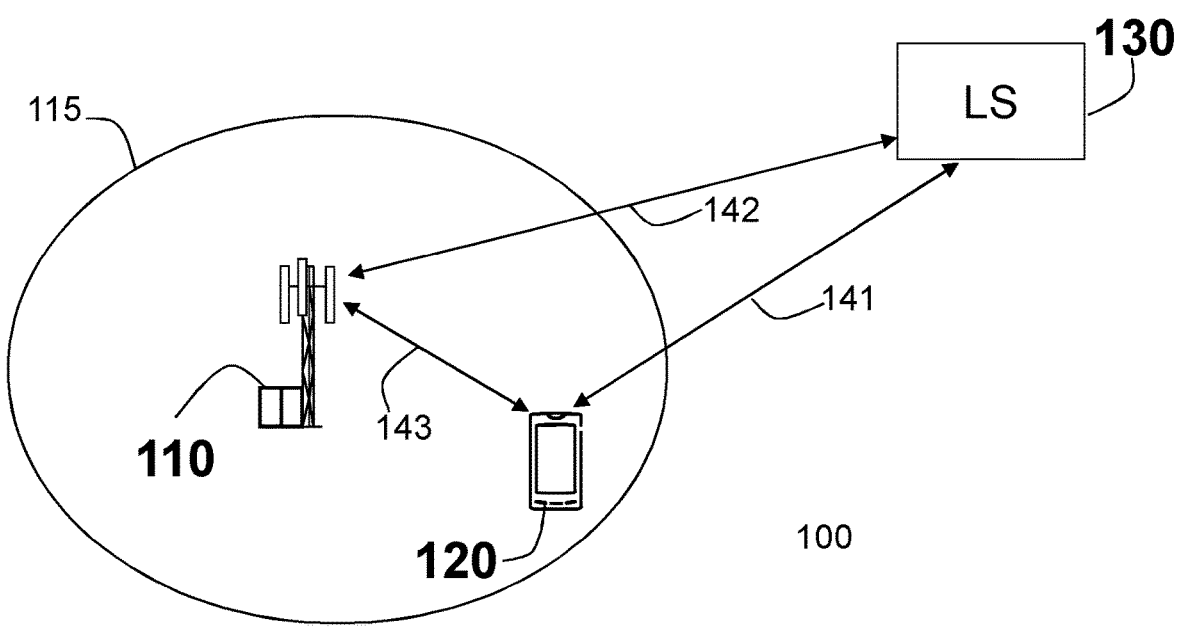
FIG. 3 is a schematic diagram illustrating a non-limiting example of a wireless communications network, according to embodiments herein.

FIG. 3 depicts a non-limiting example of a wireless communications network 100, sometimes also referred to as a wireless communications system, cellular radio system, or cellular network, in which embodiments herein may be implemented. The wireless communications network 100 may typically be a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, or an Evolved Universal Terrestrial Radio Access (E-UTRA) network. The wireless communications network 100 may also support other technologies such as, for example, a 5G system, 5G network, or Next Gen System or network, a Wide Code Division Multiplexing Access (WCDMA), Universal Terrestrial Radio Access (UTRA) TDD, Global System for Mobile Communications (GSM) network, GSM Enhanced Data rates for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 3GPP LTE has been used in this disclosure to exemplify embodiments herein, this should not be seen as limiting the scope of the embodiments herein to only the aforementioned system. Other wireless systems, especially 5G/NR, WCDMA, WiMax, UMB and GSM, may also benefit from exploiting the ideas covered within this disclosure.

The wireless communications network 100 may be considered a positioning architecture.

The wireless communications network 100 comprises a plurality of radio network nodes or base stations, for example an evolved Node B (eNB, eNodeB), or any other network node with similar features capable of serving a wireless device, such as a user equipment or a machine type communication device, in the wireless communications network 100. As a non-limiting example, an eNodeB 110 is depicted in the non-limiting example of FIG. 3. The eNodeB 110 may be a transmission point such as a radio base station. The eNodeB 110 may be understood to operate in the wireless communications network 110, a radio communications network, providing radio coverage over a geographical area which radio coverage may also be referred to as a beam or a beam group of a first radio access technology (RAT), such as 5G, LTE, Wi-Fi, Narrow Band Internet of Things (NB-IoT), LTE Category M (CAT-M), Wi-Fi, enhanced Machine-Type Communication (eMTC) or similar. The eNodeB 110 may be a transmission and reception point, e.g., a radio access network node such as a Wireless Local Area Network (WLAN) access point or an Access Point Station (AP STA), an access controller, a base station, e.g., a radio base station such as a NodeB, an NR Node B (gNB), a base transceiver station, a radio remote unit, an Access Point Base Station, a base station router, a transmission arrangement of a radio base station, a stand-alone access point or any other network unit capable of communicating with a wireless device within the service area served by the eNodeB 110 depending e.g., on the radio access technology and terminology used. The eNodeB 110 may be referred to as a serving radio network node and may be understood to communicate with a wireless device with Downlink (DL) transmissions to the wireless device and Uplink (UL) transmissions from the wireless device. Any reference herein to the eNodeB 110 may be understood to equally refer to a radio network node or base station as described herein, unless otherwise noted.

The wireless communications network 100 covers a geographical area which may be divided into cell areas, wherein each cell area may be served by a radio network node, although, one radio network node may serve one or several cells. In the non-limiting example depicted in FIG. 3, the eNodeB 110 serves a cell 115.

The eNodeB 110 may be of different classes, such as, e.g., macro base station, home base station or pico base station, based on transmission power and thereby also cell size. The eNodeB 110 may support one or several communication technologies, and while "eNodeB" is used herein as a non-limiting example, its name may depend on the technology and terminology used. eNodeB is the term used in LTE. In 5G/NR, a based station such as the eNodeB 110 may be referred to as a gNB. The eNodeB 110 may be directly connected to one or more core networks, which are not depicted in FIG. 3.

A plurality of devices, or wireless devices are located in the wireless communication network 100, whereof a wireless device 120 is depicted in the non-limiting example of FIG. 3. The wireless device 120, also referred to as a target device, or device, may e.g., be a UE, a mobile station, a non-access point (non-AP) STA, a STA, a user equipment and/or a wireless terminal, a Narrow Band Internet of Things (NB-IoT) device, an eMTC device and a CAT-M device, a WiFi device, an LTE device or an NR device. The wireless device 120 comprised in the wireless communications network 100 is enabled to communicate wirelessly in the wireless communications network 100. The wireless device 120 may communicate via one or more Access Networks (AN), e.g. RAN, to one or more core networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell, such as the cell 115. The wireless device 120 comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a tablet with wireless capability, Machine-to-Machine (M2M) device, device equipped with a wireless interface, such as a printer or a file storage device, modem, or any other radio network unit capable of communicating over a radio link in a communications system.

The wireless communications network 100 comprises also a network node 130. The network node 130 may have positioning capability, such as a Location Server (LS). In LTE, for example, the location server may be referred to as Evolved Serving Mobile Location Center (E-SMLC), and in 5G, as the Location Management Function (LMF). The network node 130 may serve and support the wireless device 120 for positioning purposes.

In other examples which are not depicted in FIG. 3, any of the network node 130 and the eNodeB 110 may be a distributed node, such as a virtual node in the cloud, and may perform its functions entirely on the cloud, or partially, in collaboration with a radio network node.

The network node 130 may be configured to communicate within the wireless communications network 100 with the wireless device 120 over a first link 141, e.g., a radio link. The network node 130 may be configured to communicate within the wireless communications network 100 with the eNodeB 110, over a second link 142, e.g., a radio link or a wired link. The network node 130 may be configured to communicate within the wireless communications network 100 with the wireless device 120, over a third link 143, e.g., a radio link.

In general, the usage of "first", "second" and/or "third" herein may be understood to be an arbitrary way to denote different elements or entities, and may be understood to not confer a cumulative or chronological character to the nouns they modify.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 4:
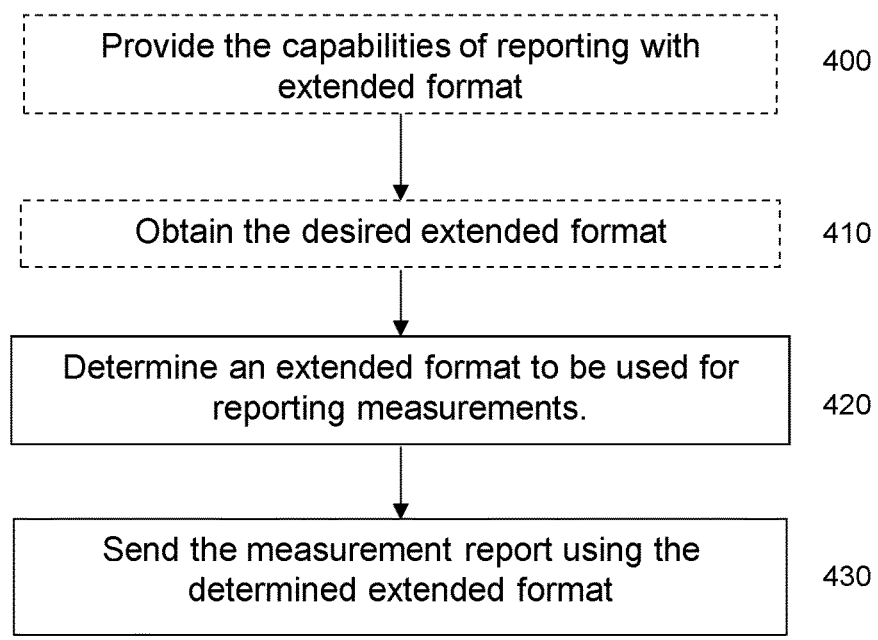
FIG. 4 is a flowchart depicting a method in a wireless device, according to embodiments herein.

An example embodiment of a flowchart depicting embodiments of a method, performed by the wireless device 120, e.g., the user equipment (UE), is depicted in FIG. 4 and will be described more in detail in the following. The method is for reporting at least one measurement to the network node 130, e.g., a location server. The method may comprise one or more of the following actions which actions may be taken in any suitable order. The wireless device 120 and the network node 130 operate in the wireless communication network 100.

In some embodiments all the actions may be performed. In some embodiments, one or more actions may be optional. In FIG. 4, an optional action is indicated with dashed lines. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 4.

Action 400

During the course of operations in the wireless communications network 100, determining of a position of the wireless device 120, may necessary or desired. The wireless device 120, either in anticipation of, or in response to a request from the network node 130, may optionally, in this Action 400, provide, to the network node 130, capabilities of reporting with an extended format for at least one of: a code phase measurement, a carrier phase measurement or a GNSS Signal ID.

The extended format is a format, that is, a structure of data or information, to be used for reporting, to the network node 130, at least one of: a code phase measurement, a carrier phase measurement or a Global Navigation Satellite System (GNSS) Signal Identifier (ID). The extended format extends at least one of: a range or a resolution, of an existing format for reporting, to the network node 130, the at least one of: the code phase measurement, the carrier phase measurement or the GNSS Signal ID.

The existing format may be understood as a format having a normal or lower range and or resolution. For example, the existing format may be a format configured in the wireless device 120, or it may be a format configured in older, or less advanced, wireless devices. In a particular example, the existing format may be that described in 3GPP TS 36.355, version14.2.0.

Extending may be understood as increasing. This may be implemented, for example, by increasing a number of bits of the report, thereby allowing more information, or more precise information, to be provided in the measurement report. For example, by increasing the number of bits either the range in which the measurement may be reported or the resolution of the measurement, may be increased. The added number of bits, e.g., a new parameter, field, or value, may then be combined, e.g., added, multiplied, subtracted, or in any other function, with other bits in the existing format, to indicate an increased range or resolution of data. Some examples of this will be provided later.

The range of the existing format may be understood, e.g., as a number of quantities that may be reported, which may be later on equivalent to distance or some other physical parameter.

The resolution of the existing format may be understood e.g., as an interval scale between two potential reported quantities, meaning that by increasing the resolution, for example the position may be estimated with a higher accuracy scale.

Therefore, according to some examples herein, the wireless device 120 may, in this Action 400, optionally provide to the network node 130, its capabilities of code or/and carrier phase measurement in terms of the extended format, which may comprise a normal resolution and higher resolution, and a varied resolution. In a particular example, in this Action 400, the wireless device 120 may optionally provide to the network node 130 capabilities of reporting with the extended format for code phase measurement and/or carrier phase measurement.

According to embodiments herein, the capabilities of reporting with the extended format, which may be also referred to as the capable extended format, or capable format, may comprise a first resolution, a second resolution, which is higher than the first resolution, and a varied resolution. Additionally, the extended format may comprise a first range, and a second range, which is extended compared to the first range.

Providing may be understood as, e.g., sending. The providing may be implemented, for example, via the first link 141.

The Extended Format

The extended format will be described next, with further detail.

The extended format may comprise at least one Information Element (IE) in a GNSS-MeasurementList IE.

The extended format, or capable extended format, may comprise one or more of: a) an IE for extending, that is, an IE extending, the range of an Accumulated DeltaRange (ADR) measurement, b) an IE for indicating, or indicating, a pseudorange Root Mean Square (RMS) error value for an ADR measurement, c) an IE allowing an adr, or ADR, sign to have a full range of carrier phase measurement direction, that is, with respect to the existing format, d) an IE allowing a finer resolution of codephase measurement, that is, with respect to the existing format, and e) an IE for indicating a GNSS signal, where all of which may be in a GNSS-MeasurementList IE.

The measurement may be of a satellite signal, that is a signal from a satellite system, such as, e.g., GPS, GLONASS, GALILEO, BeiDou, and GNSS RTK.

How each of the measurement reports for each of the measurements may be extended with the extended format will be further described below, with more detailed embodiments.

ADR Measurement Report

According to some examples of the extended format of embodiments herein, the ADR measurement report in LPP may be extended from the current 25 bits of the existing format to 29 bits, with a resolution of 2-10 meters (INTEGER (0 . . . 536870911)).

It may be appreciated that, it may not be possible to simply change the range, as the old devices, that is the devices supporting only the existing format, may still consider a 25 bits transmission. According to embodiments herein, there may be two ways to accomplish this.

In one embodiment, a new parameter may be added with 29 bits to take care of devices, e.g., the wireless device 120, with higher resolution as indicated below, which shows how a GNSS-MeasurementList IE may be modified according to embodiments herein by adding e.g., the parameter "adr-Ext-v15xy INTEGER (0 . . . 536870911)":

with field "adr" in the existing format may represent any number that may be within the range, that is, e.g., the interval between the minimum and maximum values in the parenthesis.

For instance, to report 33554439, adr-Ext may have a value of 1, and adr may have a value of 7. Similarly, to report 536870911, adr-Ext may have a value of 15, and adr may have a value of 33554431. (adr-Ext*33554432+adr).

```
-- ASN1START
GNSS-MeasurementList ::= SEQUENCE (SIZE(1..16)) OF GNSS-
MeasurementForOneGNSS
GNSS-MeasurementForOneGNSS ::= SEQUENCE {
    gnss-ID                     GNSS-ID,
    gnss-SgnMeasList            GNSS-SgnMeasList,
    ...
)
GNSS-SgnMeasList ::= SEQUENCE (SIZE(1..8)) GNSS-SgnMeasElement
GNSS-SgnMeasElement ::= SEQUENCE {
    gnss-SignalID               GNSS-SignalID,
    gnss-CodePhaseAmbiguity     INTEGER (0..127)    OPTIONAL,
    gnss-SatMeasList            GNSS-SatMeasList,
    ...
}
GNSS-SatMeasList            ::= SEQUENCE (SIZE(1..64))OF GNSSSatMeasElement
GNSS-SatMeasElement ::= SEQUENCE {
    svID                    SV-ID,
    cNo                     INTEGER (0..63),
    mpathDet                ENUMERATED {notMeasured (0), low (1), medium
(2), high (3), ...},
    carrierQualityInd           INTEGER (0..3)          OPTIONAL,
    codePhase                   INTEGER (0..2097151),
    integerCodePhase            INTEGER (0..127)        OPTIONAL,
    codePhaseRMSError           INTEGER (0..63),
    doppler                     INTEGER (-32768..32767) OPTIONAL,
    adr                         INTEGER (0..33554431)   OPTIONAL,
    ...,
    [[adr-Ext-v15xy             INTEGER (0..536870911)  OPTIONAL]]
    }
-- ASN1STOP
```

In another embodiment, similar support may be given by only adding an integer value in the range of 0 to 15 to represent the most significant bits, e.g., those that are further to the left, of the measurement, as shown in the example below, which shows how a GNSS-MeasurementList IE may be modified according to embodiments herein by e.g., adding the integer value "adr-Ext-v15xy INTEGER (0 . . . 15) OPTIONAL":

In a further particular non-limiting example, the extended format may be based on the following description of the fields just described, as indicated below:

Adr
This field contains the ADR measurement measured by the target

```
GNSS-SatMeasElement ::= SEQUENCE {
    svID            SV-ID,
    cNo             INTEGER (0..63),
    mpathDet        ENUMERATED {notMeasured (0), low (1), medium
(2), high (3), ...},
    carrierQualityInd       INTEGER (0..3)          OPTIONAL,
    codePhase               INTEGER (0 .. 2097151) ,
    integerCodePhase        INTEGER (0..127)        OPTIONAL,
    codePhaseRMSError       INTEGER (0..63),
    doppler                 INTEGER (-32768..32767) OPTIONAL,
    adr                     INTEGER (0..33554431)   OPTIONAL,
    ...,
    [[ adr-Ext-v15xy        INTEGER (0..15)         OPTIONAL
    ]]
}
-- ASN1STOP
```

This field may be understood to extend the range of adr in the existing format in order to support the RTK measurements. To allow optimized encoding, this field may be inserted to the most significant bit of adr. This additional field, which may be called e.g., "adr-ext-v15xy" together -continued device for the particular satellite signal. This information can be used to compute the 3-D velocity or high-accuracy position of the target device. ADR measurements are converted into units of -continued meter by multiplying the ADR measurement by the nominal wavelength of the measured signal.
Scale factor $2^{-10}$ meters, in the range from 0 to 32767.5 meters. This field is optional, but shall be included, if the adrMeasReq in GNSS-PositioningInstructions is set to TRUE and if ADR measurements are supported by the target device (i.e., adr-Support is set to TRUE in A-GNSS-ProvideCapabilities).
adr-Ext
This field extends the range of ADR measurement measured by the target device for the particular satellite signal. To represent values larger than 33554431, both adr-Ext and adr shall be used together, while adr-Ext represent the most significant bits of the measurement. New value = adr-Ext*33554432 + adr. For instance, to represent 33554439, adr-Ext will have value 1 and adr will have value 7. With this extension, the ADR measurement report is enhanced from 25-bits (adr) to 29-bits (adr + adr-Ext), while the resolution is kept as $2^{-10}$ meters. This field is optional, but shall be included, if the adr-Ext-Support is set to TRUE in A-GNSS-ProvideCapabilities).

Other fields in the GNSS-MeasurementList IE may be described as follows below:

Other GNSS-MeasurementList field descriptions gnss-ID
This field identifies the GNSS constellation on which the GNSS signal measurements were measured. Measurement information for up to 16 GNSSs can be included.
gnss-SgnMeasList
This list provides GNSS signal measurement information for up to 8 GNSS signal types per GNSS.
gnss-SignalID
This field identifies the signal on which GNSS signal measurement parameters were measured.
gnss-CodePhaseAmbiguity
This field provides the ambiguity of the code phase measurement. It is given in units of milli-seconds in the range between between 0 and 127 milli-seconds.
The total code phase for a satellite k (Satk) is given modulo this gnss-CodePhaseAmbiguity and is reconstructed with:
Code_Phase_Tot(Satk) = codePhase(Satk) + integerCodePhase(Satk) + n * gnss-CodePhaseAmbiguity, n = 0, 1, 2, . . .
If there is no code phase ambiguity, the gnss-CodePhaseAmbiguity shall be set to 0.
The field is optional. If gnss-CodePhaseAmbiguity is absent, the default value is 1 milli-second.
gnss-SatMeasList
This list provides GNSS signal measurement information for up to 64 GNSS satellites.
svID
This field identifies the satellite on which the GNSS signal measurements were measured.
cNo
This field provides an estimate of the carrier-to-noise ratio of the received signal from the particular satellite. The target device shall set this field to the value of the satellite $C/N_0$, as referenced to the antenna connector, in units of 1 dB-Hz, in the range from 0 to 63 dB-Hz.
Scale factor 1 dB-Hz.
mpathDet
This field contains the multipath indicator value, defined in the table Value of mpathDet to Multipath Indication relation below.
carrierQualityInd
This field indicates the quality of a carrier phase measurement. The LSB indicates the data polarity, that is, if the data from a specific satellite is received inverted, this is indicated by setting the LSB value to '1'. In the case the data is not inverted, the LSB is set to '0'. The MSB indicates if accumulation of the carrier phase has been continuous, that is, without cycle slips since the previous measurement report. If the carrier phase accumulation has been continuous, the MSB value is set to '1X'. Otherwise, the MSB is set to '0X'.

Other GNSS-MeasurementList field descriptions

This field is optional but shall be included if the adr field is included. See table Bit toPolarity Indication relation below.
codePhase
This field contains the whole and fractional value of the code-phase measurement made by the target device for the particular satellite signal at the time of measurement in the units of ms.
GNSS specific code phase measurements (e.g. chips) are converted into unit of ms by dividing the measurements by the nominal values of the measured signal chipping rate.
Scale factor $2^{-21}$ milli-seconds, in the range from 0 to $(1-2^{-21})$ milli-seconds.
integerCodePhase
This field indicates the integer milli-second part of the code phase that is expressed modulo the gnss-CodePhaseAmbiguity. The value of the ambiguity is given in the gnss-CodePhaseAmbiguity field.
The integerCodePhase is optional. If integerCodePhase is absent, the default value is 0 milli-second.
Scale factor 1 milli-second, in the range from 0 to 127 milli-seconds.
codePhaseRMSError
This field contains the pseudorange RMS error value. This parameter is specified according to a floating-point representation shown in the table below.
doppler
This field contains the Doppler measured by the target device for the particular satellite signal. This information can be used to compute the 3-D velocity of the target device. Doppler measurements are converted into unit of m/s by multiplying the Doppler measurement in Hz by the nominal wavelength of the measured signal.
Scale factor 0.04 meter/seconds. This field is optional, but shall be included, if the velocityRequest in CommonIEsRequestLocationInformation is set to TRUE.

Also, other accompanying information in the relevant specification may be described as follows:

Value of mpathDet to Multipath Indication relation

| Value of mpathDet | Multipath Indication |
| --- | --- |
| 00 | Not measured |
| 01 | Low, MP error < 5 m |
| 10 | Medium, 5 m < MP error < 43 m |
| 11 | High, MP error > 43 m |

Bit toPolarity Indication relation

| Value | Polarity Indication |
| --- | --- |
| 0 | Data Direct, carrier phase not continuous |
| 1 | Data Inverted, carrier phase not continuous |
| 2 | Data Direct, carrier phase continuous |
| 3 | Data Inverted, carrier phase continuous |

| floating-point representation | | | | |
| --- | --- | --- | --- | --- |
| Index | Mantissa | Exponent | Floating-Point value, $x_i$ | Pseudorange value, P |
| 0 | 000 | 000 | 0.5 | P < 0.5 |
| 1 | 001 | 000 | 0.5625 | 0.5 <= P < 0.5625 |
| I | X | Y | $0.5 * (1 + x/8) * 2^y$ | $x_{i-1}$ <= P < $x_i$ |
| 62 | 110 | 111 | 112 | 104 <= P < 112 |
| 63 | 111 | 111 | — | 112 <= P |

In order to provide, to the network node 130, the capabilities of reporting with the extended format a field, for example an IE in a A-GNSS-ProvideCapabilities IE may be used to specify whether the wireless device 120 supports the ADR measurement reporting extension. This field may be called, e.g., "adr-Ext-Support-v15xy BOOLEAN, OPTIONAL—Cond adr", as depicted in the example below:

```
-- ASN1START
A-GNSS-ProvideCapabilities ::= SEQUENCE {
    gnss-SupportList              GNSS-SupportList        OPTIONAL,
    assistanceDataSupportList AssistanceDataSupportList
OPTIONAL,
    locationCoordinateTypes       LocationCoordinateTypes
OPTIONAL,
    velocityTypes                 VelocityTypes           OPTIONAL,
    ...,
    [[ periodicalReportingNotSupported-r14
                                  PositioningModes        OPTIONAL,
    idleStateForMeasurements-r14
                                  ENUMERATED { required } OPTIONAL
    ]]
}
GNSS-SupportList ::= SEQUENCE (SIZE(1..16)) OF GNSS-SupportElement
GNSS-SupportElement    ::= SEQUENCE {
    gnss-ID                GNSS-ID,
    sbas-IDs               SBAS-IDs       OPTIONAL,      -- Cond
GNSS-ID-SBAS
    agnss-Modes            PositioningModes,
    gnss-Signals           GNSS-SignalIDs,
    fta-MeasSupport           SEQUENCE {
                              cellTime      AccessTypes,
                              mode          PositioningModes,
                              ...
                           }                    OPTIONAL, -- Cond
fta
    adr-Support            BOOLEAN,
    velocityMeasurementSupport      BOOLEAN,
    ...,
    [[
        adr-Ext-Support-v15xy      BOOLEAN,    OPTIONAL
-- Cond adr
    ]]
}
AssistanceDataSupportList ::= SEQUENCE {
    gnss-CommonAssistanceDataSupport    GNSS-
CommonAssistanceDataSupport,
    gnss-GenericAssistanceDataSupport   GNSS-
GenericAssistanceDataSupport,
    ...
}
-- ASN1STOP
```

In the example just provided above, the fields may be as described as follows:

adr-Support
This field specifies whether the target device supports ADR measurement reporting. TRUE means supported.

adr-Ext-Support
This field specifies whether the target device supports ADR measurement reporting extension. TRUE means supported.

Also, other accompanying information in the relevant specification may be described as follows:

| Conditional presence | Explanation |
| --- | --- |
| GNSS-ID-SBAS | The field is mandatory present if the GNSS-ID = sbas; otherwise it is not present. |
| fta | The field is mandatory present if the target device supports the reporting of fine time assistance measurements; otherwise it is not present. |
| adr | The field is mandatory present if the target device supports the reporting of adr extension; otherwise it is not present. |

| Conditional presence | Explanation |
| --- | --- |
| ohere A-GNSS-ProvideCapabilities field descriptions gnss-SupportList | |

| Conditional presence | Explanation |
| --- | --- |
| | This field specifies the list of GNSS supported by the target device and the target device capabilities associated with each of the supported GNSS. This field shall be present if the gnss-SupportListReq in the A-GNSS -Requestcapabilities IE is set to TRUE and if the target device supports the A-GNSS positioning method. If the IE A-GNSS-Provide-Capabilities is provided unsolicited, this field shall be included if the target device supports the assisted GNSS positioning method.
gnss-ID
This field specifies the GNSS supported by the target device for which the capabilities in GNSS-SupportElement are provided.
sbas-IDs
This field specifies the SBAS(s) supported by the target device. This is represented by a bit string, with a one-value at the bit position means the particular SBAS is supported; a zero-value means not supported.
agnss-Modes
This field specifies the GNSS mode(s) supported by the target device for the GNSS indicated by gnss-ID. This is represented by a bit string, with a one-value at the bit position means the particular GNSS mode is supported; a zero-value means not supported.
gnss-Signals
This field specifies the GNSS signal(s) supported by the target device for the GNSS indicated by gnss-ID. This is represented by a bit string, with a one-value at the bit position means the particular GNSS signal type is supported; a zero-value means not supported.
fta-MeasSupport
This field specifies that the target device is capable of performing fine time assistance measurements (i.e., GNSS-cellular time association reporting). The cellTime field specifies for which cellular network(s) this capability is supported. This is represented by a bit string, with a one-value at the bit position means FTA measurements for the specific cellular network time is supported; a zero-value means not supported. The mode field specifies for which GNSS mode(s) FTA measurements are supported by the target device. This is represented by a bit string, with a one-value at the bit position means FTA measurements for the GNSS mode is supported; a zero-value means not supported.
velocityMeasurementSupport
This field specifies whether the target device supports measurement reporting related to velocity. TRUE means supported.
assistanceDataSupportList
This list defines the assistance data and assistance data choices supported by the target device. This field shall be present if the assistanceDataSupportListReq in the A-GNSS-RequestCapabilities IE is set to TRUE and if the target device supports GNSS assistance data. If the IE A-GNSS-Provide-Capabilities is provided unsolicited, this field shall be included if the target device supports any GNSS assistance data.
locationCoordinateTypes
This parameter identifies the geographical location coordinate types that a target device supports for GNSS. TRUE indicates that a location coordinate type is supported and FALSE that it is not. This field shall be present if the locationVelocityTypesReq in the A-GNSS-RequestCapabilities IE is set to TRUE and if the target device supports UE-based or standalone GNSS positioning method. If the IE A-GNSS-Provide-Capabilities is provided unsolicited, this field shall be included if the target device supports UE-based or standalone GNSS positioning method.
velocityTypes
This parameter identifies the velocity types that a target device supports for GNSS. TRUE indicates that a velocity type is supported and FALSE that it is not. FALSE for all velocity types indicates that velocity reporting is not supported. This field shall be present if the locationVelocityTypesReq in the A-GNSS-RequestCapabilities IE is set to TRUE and if the target device supports UE-based or standalone GNSS positioning method. If the IE A-GNSS-Provide-Capabilities is provided unsolicited, this field shall be included if the target device supports UE-based or standalone GNSS positioning method.
periodicalReportingNotSupported
This field, if present, specifies the positioning modes for which the target device does not support periodicalReporting. This is represented by a bit string, with a one-value at the bit position means periodicalReporting for the positioning mode is not supported; a zero-value means supported. If this field is absent, the location server may assume that the target device supports periodicalReporting in CommonIEsRequestLocationInformation for each supported positioning mode.
idleStateForMeasurements
This field, if present, indicates that the target device requires idle state to perform GNSS measurements. |

According to the foregoing, in some embodiments, the IE extending the range of the ADR measurement may comprise at least one of: a) an added parameter, which may be called e.g., adr-Ext-v15xy, with 29 bits, or b) an added integer value, which may be called e.g., adr-Ext-v15xy, in the range of 0 to 15 representing bits of the measurement. A parameter or an integer value may be also referred to herein as a "field".

The accumulated carrier phase, also called Accumulated DeltaRange (ADR) measurement information element (IE) may be comprised in the GNSS-MeasurementList IE. The ADR measurement IE, may be also referred to as an extended ADR IE, in comparison to existing methods. The IE for extending a range of an ADR measurement, the IE for indicating, or indicating, the pseudorange RMS error value for the ADR measurement, the IE allowing the adr, or ADR, sign to have the full range of carrier phase measurement direction, that is, with respect to the existing format, and/or the IE allowing finer resolution of the codephase measurement, that is, with respect to the existing format, may be also in the ADR measurement IE. The IE indicating the GNSS signal may also be comprised in an ADR measurement IE. A range or a resolution of the ADR measurement that may be measured by the wireless device 120 may be extended by adding an IE, e.g., adr-Ext, in the ADR measurement IE.

Code Phase Measurement

According to some examples of the extended format of embodiments herein, the codePhase measurement report in LPP 3GPP TS 36.355, version 14.2.0 may be extended from the current 21-bits to 24-bits (INTEGER (0 . . . 16777215) with a 2-24 milli-seconds resolution.

In one embodiment, it may again be possible to add a new 24 bits for extending this measurement, as it is indicated below, which shows how a GNSS-MeasurementList IE may be modified according to embodiments herein by adding e.g., the parameter "codePhase-Ext-r15 INTEGER (0 . . . 16777215) OPTIONAL":

```
-- ASN1START
GNSS-MeasurementList ::= SEQUENCE (SIZE(1..16)) OF GNSS-
MeasurementForOneGNSS
GNSS-MeasurementForOneGNSS ::= SEQUENCE {
    gnss-ID                         GNSS-ID,
    gnss-SgnMeasList                GNSS-SgnMeasList,
    ...
}
GNSS-SgnMeasList ::= SEQUENCE (SIZE(1..8)) OF GNSS-SgnMeasElement
GNSS-SgnMeasElement ::= SEQUENCE {
    gnss-SignalID                   GNSS-SignalID,
    gnss-CodePhaseAmbiguity INTEGER (0..127)         OPTIONAL,
    gnss-SatMeasList                GNSS-SatMeasList,
    ...
}
GNSS-SatMeasList ::= SEQUENCE (SIZE(1..64)) OF GNSS-SatMeasElement
GNSS-SatMeasElement ::= SEQUENCE {
    svID            SV-ID,
    cNo             INTEGER (0..63),
    mpathDet            ENUMERATED {notMeasured (0), low (1), medium
(2), high (3), ...},
    carrierQualityInd       INTEGER (0..3)          OPTIONAL,
    codePhase               INTEGER (0..2097151),
    integerCodePhase        INTEGER (0..127)        OPTIONAL,
    codePhaseRMSError       INTEGER (0..63),
    doppler                 INTEGER (-32768..32767) OPTIONAL,
    adr                     INTEGER (0..33554431)   OPTIONAL,
    ...,
    [[ adr-Ext-v15xy            INTEGER (0..536870911)  OPTIONAL,
        codePhase-Ext-r15 INTEGER (0.. 16777215)    OPTIONAL
    ]]
}
-- ASN1STOP
``` codePhase-delta

In another embodiment, it may be possible to increase the resolution with an integer with the range of 0 to 7. To enable this, a delta field may be used to provide finer resolution of the codephase measurement. In addition to a reference quantity based on codePhase, capable target devices, e.g., the wireless device 120, may report a relative quantity codePhase-delta, in which case the codephase measurement may be represented by the sum of CodePhase and CodePhase-delta. The resolution of CodePhase-delta may be $2^{-24}$ ms.

TABLE 1

| Reported Relative Quantity Value | Measured Relative Quantity Value, $\Delta_{codePhase}$ | Unit |
|---|---|---|
| codePhase_delta_0 | 0 | $2^{-24}$ ms |
| codePhase_delta_1 | 1 | $2^{-24}$ ms |
| codePhase_delta_2 | 2 | $2^{-24}$ ms |
| codePhase_delta_3 | 3 | $2^{-24}$ ms |
| codePhase_delta_4 | 4 | $2^{-24}$ ms |
| codePhase_delta_5 | 5 | $2^{-24}$ ms |
| codePhase_delta_6 | 6 | $2^{-24}$ ms |
| codePhase_delta_7 | 7 | $2^{-24}$ ms |

```
GNSS-SatMeasList ::= SEQUENCE (SIZE(1..64)) OF
GNSS-SatMeasElement
GNSS-SatMeasElement ::= SEQUENCE {
    svID            SV-ID,
    cNo             INTEGER (0..63),
    mpathDet            ENUMERATED {notMeasured (0), low (1),medium
(2), high (3), ...},
    carrierQualityInd       INTEGER (0..3)          OPTIONAL,
    codePhase               INTEGER (0..2097151),
    integerCodePhase        INTEGER (0..127)        OPTIONAL,
    codePhaseRMSError       INTEGER (0..63),
    doppler                 INTEGER (-32768..32767) OPTIONAL,
    adr                     INTEGER (0..33554431)   OPTIONAL,
    ...,
    [[ adr-Ext-v15xy            INTEGER (0..536870911)  OPTIONAL,
        codePhase-delta-r15 INTEGER (0..7)          OPTIONAL
    ]]
}
-- ASN1STOP
```

CodePhase-delta may be defined as in the following Table 1. Table 1 shows how, according to an example of embodiments herein, it may be possible to quantify the code phase delta by 8 integer values, in which the resolution of each step is $2^{-24}$.

Figure 5:
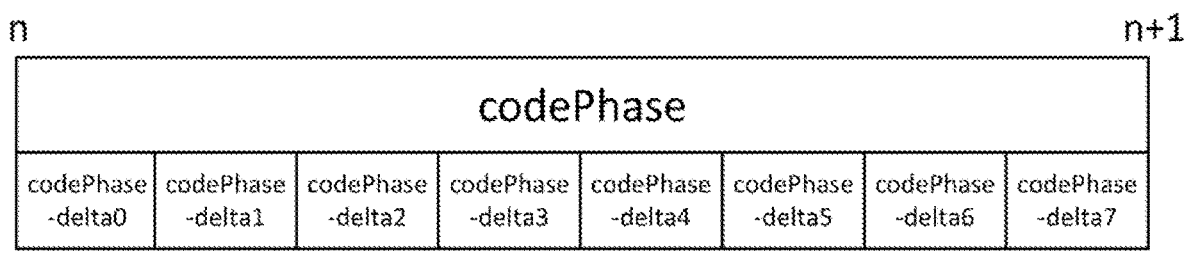
FIG. 5 is a schematic diagram illustrating a non-limiting example of how codePhase-delta and codePhase may work together, according to embodiments herein.

To illustrate how codePhase-delta and codePhase may work together, FIG. 5 may be considered. FIG. 5 is a schematic diagram depicting how the resolution of one code phase unit may be increased by code phase delta, according to an example of embodiments herein. The 0-7 integer values for code-phase delta may be represented by three binary digits. Looking at FIG. 5, the code phase delta may be considered as fractional values for the current resolution. The 3 additional bits that may be transmitted by the wireless device 120 in codePhase-delta may allow the network node 130 to decide the fractional segment in codePhase with the current resolution.

For example, if 011 is transmitted in codePhase-delta, codePhase-delta 3 is selected, as the binary representation of 3 with three digits may be considered to be 011. Looking up in the previous table, codePhase-delta 3 corresponds to $3*2^{(-24)}$ ms. The final measurement for code phase may then be $(n*2^{(3)}+3)*2^{(-24)}$ ms, wherein n is an arbitrary number.

According to the foregoing, in some embodiments, the IE allowing the finer resolution of the codephase measurement with respect to the existing format may comprise at least one of: a) a parameter, which may be called e.g., codePhase-Ext-r15, with 24 bits, or b) an added integer value, which may be called e.g., codePhase-delta-r15, in the range of 0 to 7.

GNSS Signal ID

According to some examples of the extended format of embodiments herein, the current 8-bit GNSS-SignalID in LPP may be extended to 32-bits with the mapping defined in Radio Technical Commission for Maritime Services (RTCM) standard 10403.3, v3.3, Oct. 7, 2016.

For this extension, as 8 bits may be extended to 32 bits, a new field with the new extension bits may be the most optimum choice, as depicted below, which shows how a GNSS-MeasurementList IE may be modified according to embodiments herein by adding e.g., the parameter "gnss-SignalID-Ext-v15xy INTEGER (0 . . . 31)":

```
-- ASN1START
GNSS-SignalID ::= SEQUENCE {
    gnss-SignalID            INTEGER (0 .. 7),
    ...,
    gnss-SignalID-Ext-v15xy  INTEGER (0 .. 31)
}
-- ASN1STOP
```

In the example just provided above, the fields may be as described as follows:

| GNSS-SignalID field descriptions |
|---|
| gnss-SignalID<br>This field specifies a particular GNSS signal. The interpretation of gnss-SignalID depends on the GNSS-ID and is as shown in the table System to Value & Explanation relation.<br>gnss-SignalID-Ext<br>This field extends the GNSS signal for the adoption of RTCM standard in 3gpp. The detailed mapping table is FFS. |

According to the foregoing, in some embodiments, the IE indicating the GNSS signal may comprise an additional field, which may be called e.g., gnss-SignalID-Ext, with 32 bits.

ADR RMS Error and ADR Sign

According to some examples of the extended format of embodiments herein, an adrRMSerror field may be added to the GNSS measurement report in LPP defined as "RMS error of the continuous carrier phase" (INTEGER(0 . . . 127) with resolution 2-10 meters. This is depicted below, which shows how a GNSS-MeasurementList IE may be modified according to embodiments herein by adding e.g., the parameter "adrRMSerror-r15 INTEGER (0 . . . 127) OPTIONAL".

The "adr" sign may be added to allow the full range of carrier phase measurement direction, as depicted below, which shows how a GNSS-MeasurementList IE may be modified according to embodiments herein by adding e.g., the parameter "adrSign-r15 BOOLEAN OPTIONAL":

```
GNSS-SatMeasList ::= SEQUENCE (SIZE(1..64)) OF GNSS-SatMeasElement
GNSS-SatMeasElement ::= SEQUENCE {
    svID                SV-ID,
    cNo                 INTEGER (0..63),
    mpathDet            ENUMERATED {notMeasured (0), low (1), medium (2), high (3), ...},
    carrierQualityInd   INTEGER (0..3)              OPTIONAL,
    codePhase           INTEGER (0..2097151),
    integerCodePhase    INTEGER (0..127)            OPTIONAL,
    codePhaseRMSError   INTEGER (0..63),
    doppler             INTEGER (-32768..32767)     OPTIONAL,
    adr                 INTEGER (0..33554431)       OPTIONAL,
    ...,
    [[  adr-Ext-v15xy       INTEGER (0..536870911)  OPTIONAL,
        codePhase-delta-r15 INTEGER (0..7)          OPTIONAL,
        adrRMSerror-r15     INTEGER (0..127)        OPTIONAL,
        adrSign-r15         BOOLEAN                 OPTIONAL
    ]]
}
-- ASN1STOP
```

In the example provided above, the fields may be as described as follows:

| |
|---|
| adrRMSerror<br>This field contains the pseudorange RMS error value for adr. This parameter is specified according to a floating-point representation shown in the table below.<br>adrSign<br>This field allows adr sign to have the full range of carrier phase measurement direction. |

According to the foregoing, in some embodiments, the IE indicating the pseudorange RMS error value for the ADR measurement may comprise an additional field, which may be called e.g., adrRMSerror-r15.

According to the foregoing, in some embodiments, the IE allowing the ADR sign to have the full range of carrier phase measurement direction with respect to the existing format may comprise an additional field, which may be called e.g., adrSign.

By performing the providing in this Action 400, the wireless device 120 may enable the network node 130 to know if the wireless device 120 is capable or not of reporting measurements of e.g., satellite signals, with the extended format, so that the network node 130 may be able to appropriately receive and handle a future measurement report from the wireless device 120, e.g., process the information comprised in the report, and eventually estimate the position of the wireless device 120 based on the received measurement report, with a higher accuracy than existing methods.

Action 410

In this Action 410, the wireless device 120 may optionally obtain a desired extended format from the network node 130. For example, in this Action 410, the wireless device 120 may optionally receive from the network node 130 an indication about the desired extended format.

Obtaining may be understood as receiving, for example, via the first link 141.

In some embodiments, e.g., wherein Action 400 may have been performed, the obtained desired extended format may be based on the provided capabilities of reporting.

However, the network node 130 may have also autonomously provided the first desired extended format, without any capabilities having been sent by the wireless device 120.

By obtaining the desired extended format in this Action 410 from the network node 110, the wireless device 120 is enabled to provide better code and carrier phase measurements from each satellite, which may result in e.g., cm-level positioning accuracy fix compared to the precious meter-level accuracy provided by GNSS support.

Action 420

In this Action 420, the wireless device 120 determines the extended format to be used for reporting, to the network node 130, the at least one of: the code phase measurement, the carrier phase measurement or the GNSS Signal ID. As stated earlier, the extended format extends at least one of: the range or the resolution, of the existing format for reporting, to the network node 130, the at least one of: the code phase measurement, the carrier phase measurement or the GNSS Signal ID.

In some particular examples, in this Action 420, the wireless device 120 may determine the extended format to be used for reporting the code phase measurement and/or carrier phase measurement.

Determining may be understood as deciding, calculating, deriving, etc. . . .

The determined extended format may comprise at least one of the IEs in the capable extended format, that is, the extended format the wireless device 120 may be capable of using, as described before.

In some embodiments wherein Action 410 may have been performed, the determining 320 of the extended format may be based on the obtained desired extended format.

The wireless device 120 may perform the code phase measurement and/or carrier phase measurement, e.g., in conventional manner.

By determining the extended format in this Action 420, the wireless device 120 may be enabled to more flexibly decide the extended format to be used for the reporting. For example, the wireless device 120 may determine the extended format to be used for reporting based on the desired extended format by the location server, but this may not always be necessary. The wireless device 120 may agree with the indicated desired extended format, or select a different extended format. The determining in this Action 420 may be based on one or more criteria. For example, the wireless device 120 may determine an appropriate representation of measurement with the extended format based on the estimated accuracy of the measurement. That is, there may be instances wherein the wireless device 120 may consider that there may be some reasons for having a relatively large measurement error. In such instances, the wireless device 120 may consider that there is no need for example to report with the extended format.

Action 430

In this Action 430, the first node 101 sends a measurement report comprising the at least one of: the code may phase measurement, the carrier phase measurement or the GNSS Signal ID, to the network node 130, using the determined extended format.

Sending may be understood as, e.g., providing. The sending may be implemented, for example, via the first link 141. The measurement report may be sent by using a LPP signalling.

In some examples, the wireless device 120 may send the measurement report and optionally include information about the selected extended format.

By sending the measurement report using the determined extended format in this Action 430, the wireless device 120 is able to provide results for carrier phase measurements and/or code phase measurements, which allow for finer measurement resolution or varied measurement resolution, with respect to existing methods. This is furthermore performed in an efficient and backward compatible manner. For example, the minimum number of bits may be used to apply this enhancement, and previous signalling, e.g., adr signalling, may be used for transmitting a large part of the measurement.

Figure 6:
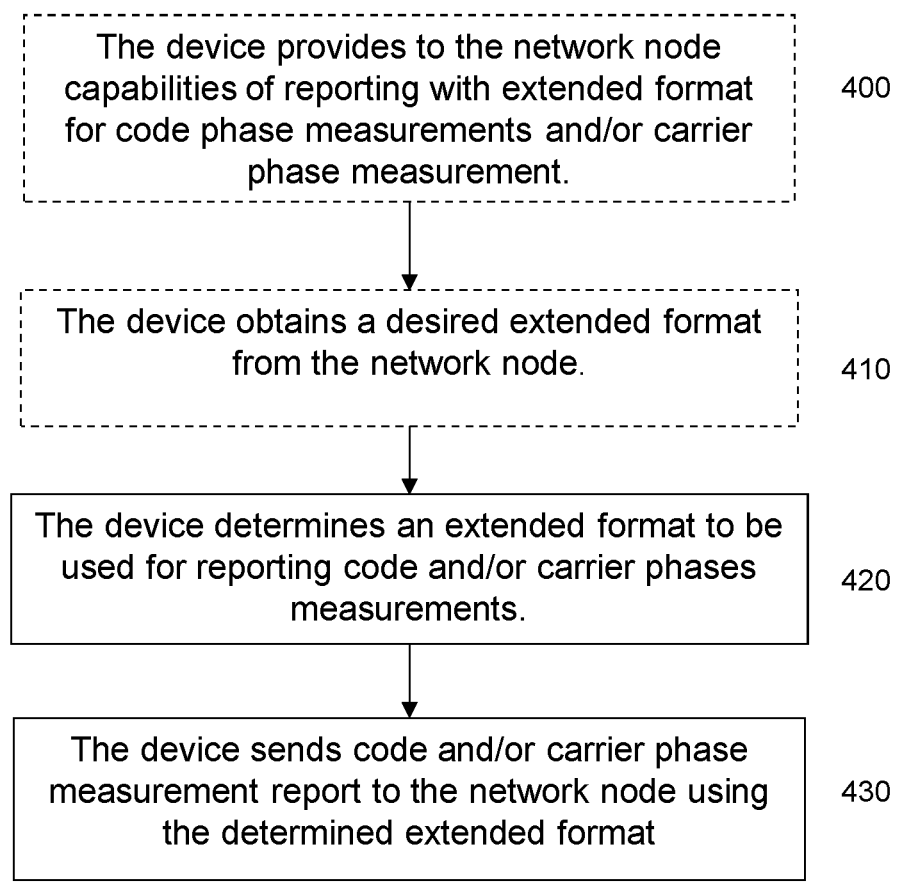
FIG. 6 is a flowchart depicting an example of a method in a wireless device, according to embodiments herein.

FIG. 6 depicts an example embodiment of a flowchart depicting embodiments of the method performed by the wireless device 120, according to the description provided. In FIG. 6, optional actions are indicated with dashed lines.

Figure 7:
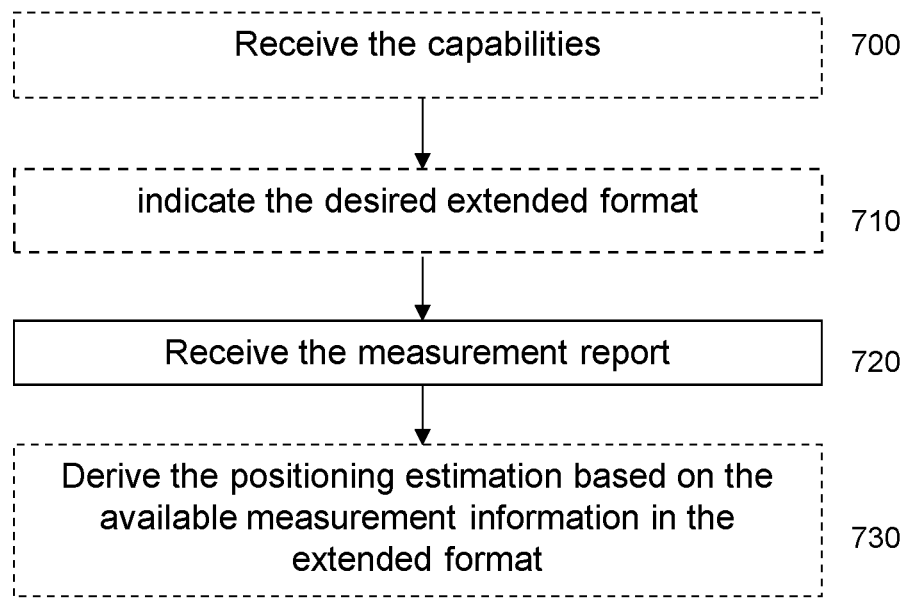
FIG. 7 is a flowchart depicting a method in a network node, according to embodiments herein.

An example embodiment of a flowchart depicting embodiments of a method, performed by the network node 130, e.g., a location server in a Real Time Kinematic (RTK) Global Navigation System (GNNS), is illustrated in FIG. 7 and will be described more in detail in the following. The method may be understood to be for handling the report of at least one measurement from the wireless device 120. In some embodiments, the method may be for estimating a position of a user equipment (UE) such as the wireless device 120. The location server may also be called a network node 130, e.g., an E-SMLC. The method may comprise one or more of the following actions which actions may be taken in any suitable order. The wireless device 120 and the network node 130 operate in the wireless communication network 100.

In some embodiments all the actions may be performed. In some embodiments, one or more actions may be optional. In FIG. 7, an optional action is indicated with dashed lines. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 7.

The detailed description of some of the following corresponds to the same references provided above, in relation to the actions described for the wireless device 120, and will thus not be repeated here to simplify the description, however, it applies equally. For example, the measurement may be of a satellite signal.

Action 700

The network node 130, either in anticipation of, or in response to a request from the network node 130, may optionally, in this Action 700, receives, from the wireless device 120, the capabilities of reporting with the extended format for the at least one of: the code phase measurement, the carrier phase measurement or the GNSS Signal ID.

Receiving may be implemented, for example, via the first link 141.

In some particular examples, the network node 130 may receive the supported carrier/code phase measurement capabilities from the wireless device 120. That is, in some particular examples, in this Action 700, the network node 130 may receive the capabilities of reporting with the extended format for code phase measurement and/or carrier phase measurement.

The network node 130 may receive the capabilities of reporting with the extended format as indicated in a field, for example an IE. The IE may be, for example, in a A-GNSS-ProvideCapabilities IE may be used to specify whether the wireless device 120 supports, e.g., the ADR measurement reporting extension.

By receiving the capabilities in this Action 700, the network node 130 is enabled to know if the wireless device 120 is capable or not of reporting measurements of e.g., satellite signals, with the extended format, so that the network node 130 may be able to appropriately receive and handle a future measurement report from the wireless device 120, e.g., process the information comprised in the report, and eventually estimate the position of the wireless device 120 based on the received measurement report, with a higher accuracy than existing methods.

Action 710

The network node 130 may optionally indicate the desired extended format about representation of measurement to the wireless device 120. That is, in this Action 710, the network node 130 may optionally indicate, to the wireless device 120, the desired extended format for reporting at least one of: the code phase measurement, the carrier phase measurement or the GNSS Signal ID.

Indicating may be understood as sending the indication about the desired extended format, for example, via the first link 141.

In some examples, this Action 710, the network node 130 may indicate the desired extended format for code phase measurement and/or the carrier phase measurement to the wireless device 120. For instance, to indicate the desired extended format may comprise at least one of the above IE in the extended format, or capable extended format.

In some embodiments, e.g., wherein Action 700 may have been performed, the indicated desired extended format may be based on the received capabilities of reporting.

However, the network node 130 may have also autonomously provided the desired extended format, without any capabilities having been sent by the wireless device 120.

By indicating the desired extended format for reporting in this Action 710, the network node 110 may enable the wireless device 120 to provide better code and carrier phase measurements from each satellite, which may result in e.g., cm-level positioning accuracy fix compared to the precious meter-level accuracy provided by GNSS support.

Action 720

The network node 130 may then receive a measurement report in the extended format from the wireless device 120. In this Action 720, the network node 130 receives, from the wireless device 120, the measurement report comprising the at least one of: the code phase measurement, the carrier phase measurement or the GNSS Signal ID, using the extended format. As stated earlier, the extended format extends the at least one of: the range or the resolution, of the existing format for reporting, to the network node 130, the at least one of: the code phase measurement, the carrier phase measurement or the GNSS Signal ID.

Receiving may be implemented, for example, via the first link 141. The measurement report may be received using a LPP signalling.

In some particular examples, in this Action 720, the network node 130 may receive the measurement report comprising the code phase measurement and/or the carrier phase measurement to the network node 130 using the determined extended format from the wireless device 120, using the determined extended format.

The extended format may comprise at least one Information Element (IE) in the GNSS-MeasurementList IE.

In some embodiments, the extended format may comprise at least one of: a) the IE extending the range of the ADR measurement; b) the IE indicating the pseudorange RMS error value for the ADR measurement; c) the IE allowing the ADR sign to have the full range of carrier phase measurement direction with respect to the existing format; d) the IE allowing the finer resolution of the codephase measurement with respect to the existing format, or e) the IE indicating the GNSS signal.

In some embodiments, at least one of: a) the IE extending the range of the ADR measurement, b) the IE indicating the pseudorange RMS error value for the ADR measurement, c) the IE allowing the ADR sign to have the full range of carrier phase measurement direction with respect to the existing format, d) the IE allowing the finer resolution of the codephase measurement with respect to the existing format, or e) the IE indicating the GNSS signal, may be comprised in the ADR measurement IE.

In some embodiments, the IE extending the range of the ADR measurement may comprise at least one of: a) an added parameter, which may be called e.g., adr-Ext-v15xy, with 29 bits, or b) an added integer value, which may be called e.g., adr-Ext-v15xy, in the range of 0 to 15 representing bits of the measurement.

In some embodiments, the IE allowing the finer resolution of the codephase measurement with respect to the existing format may comprise at least one of: a) a parameter, which may be called e.g., codePhase-Ext-r15, with 24 bits, or b) an added integer value, which may be called e.g., codePhase-delta-r15, in the range of 0 to 7.

In some embodiments, the IE indicating the GNSS signal may comprise an additional field, which may be called e.g., gnss-SignalID-Ext, with 32 bits.

In some embodiments, the IE indicating the pseudorange RMS error value for the ADR measurement may comprise an additional field, which may be called e.g., adrRMSerror-r15.

In some embodiments, the IE allowing the ADR sign to have the full range of carrier phase measurement direction with respect to the existing format may comprise an additional field, which may be called e.g., adrSign.

By receiving the measurement report using the extended format in this Action 720, the network node 130 is enabled to obtain results for carrier phase measurements and/or code phase measurements, which allow for finer measurement resolution or varied measurement resolution, with respect to existing methods. This is furthermore performed in an efficient and backward compatible manner. For example, the minimum number of bits may be used to apply this enhancement, and previous signalling, e.g., adr signalling, may be used for transmitting a large part of the measurement.

Action 730

In this Action 730, the network node 130 may estimate a position of the wireless device 120 based on the received measurement report using the extended format.

Estimating may be understood as, e.g., calculating. That is, the network node 130 may receive the measurement report from the wireless device 130. Then, the network node 130 may derive the measurement from the measurement report in consideration of the supported features, and estimate the RTK GNSS positioning.

By sending the measurement report using the determined extended format in this Action 430, the wireless device 120 is able to provide results for carrier phase measurements and/or code phase measurements, which allow for finer measurement resolution or varied measurement resolution, with respect to existing methods. This is furthermore performed in an efficient and backward compatible manner. For example, the minimum number of bits may be used to apply this enhancement, and previous signalling, e.g., adr signalling, may be used for transmitting a large part of the measurement.

Moreover, the embodiment enables a systematic approach for the network node 130 to receive proper code and/or carrier phase measurement for different satellite systems and hence a more accurate positioning estimation obtained at the network node 130, in which the detailed RTK correction error data may be available.

Any of the signalling corresponding to Actions 700, 710, and/or 720 may be performed directly between the network node 130 and the wireless device 120, or indirectly, via the eNodeB 110, e.g., via the second link 142 and the third link 143. In some particular examples, the network node 130 may be itself a base station such as the eNodeB 110, or may be located in or co-located with it. Therefore any description provided herein for the method performed by the network node 130, may be equally understood to apply to a base station such as the eNodeB 110, in some examples.

Figure 8:
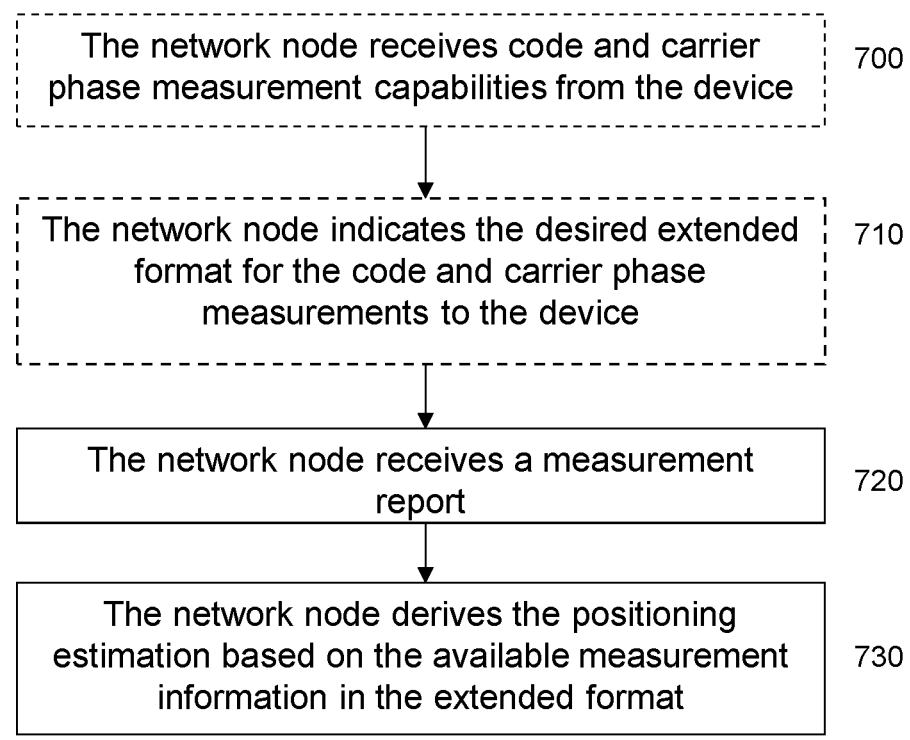
FIG. 8 is a flowchart depicting an example method in a network node, according to embodiments herein.

FIG. 8 depicts an example embodiment of a flowchart depicting embodiments of the method performed by the network node 130, according to the description provided. In FIG. 8, optional actions are indicated with dashed lines.

Figure 9:
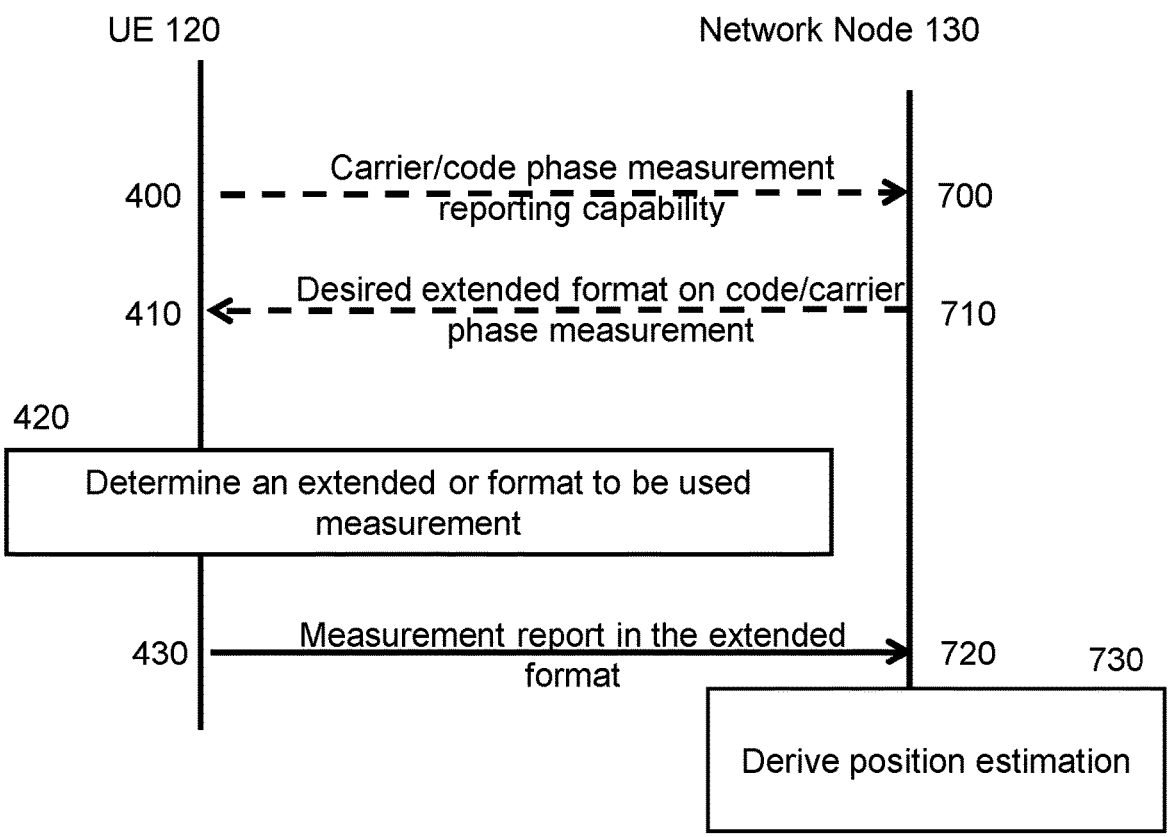
FIG. 9 is a signalling diagram depicting an example of a method in a wireless device and a network node, according to embodiments herein.

FIG. 9 depicts a schematic diagram of the signalling between the wireless device 120, here denoted as a UE, and the network node 130, that may be performed according to embodiments herein, and according to the descriptions provided in reference to FIG. 4, FIG. 6, FIG. 7 and FIG. 8.

An advantage with embodiments herein may include an extended format for carrier phase measurement and/or code phase measurement, which allows for finer measurement resolution or varied measurement resolution, with respect to existing methods. Embodiments herein enable to increase the resolution and extend the measurements for carrier phase and/or code, which may be applied in an efficient and backward compatible manner. For example, in particular the advantages of embodiments herein may comprise that, by proposing to have adr-ext, the reporting range of the carrier phase is extended, however it is possible to efficiently use the minimum number of bits to apply this enhancement, and to reuse the previous adr signaling for transmitting a large part of the measurement. Also, in particular, by proposing to add codePhase-delta, again it is possible to optimize the signaling procedure while increasing the resolution.

Referring back to FIG. 4 again, which illustrates the basic step of the embodiment from the device perspective, it may be noted that the basic step is developed further based on U.S. provisional application 62/544,237, the contents of which are incorporated herein. Here, a more general format of measurement representation is included, which allows for finer measurement resolution or varied measurement resolution as an application and/or user may desire.

Figure 10:
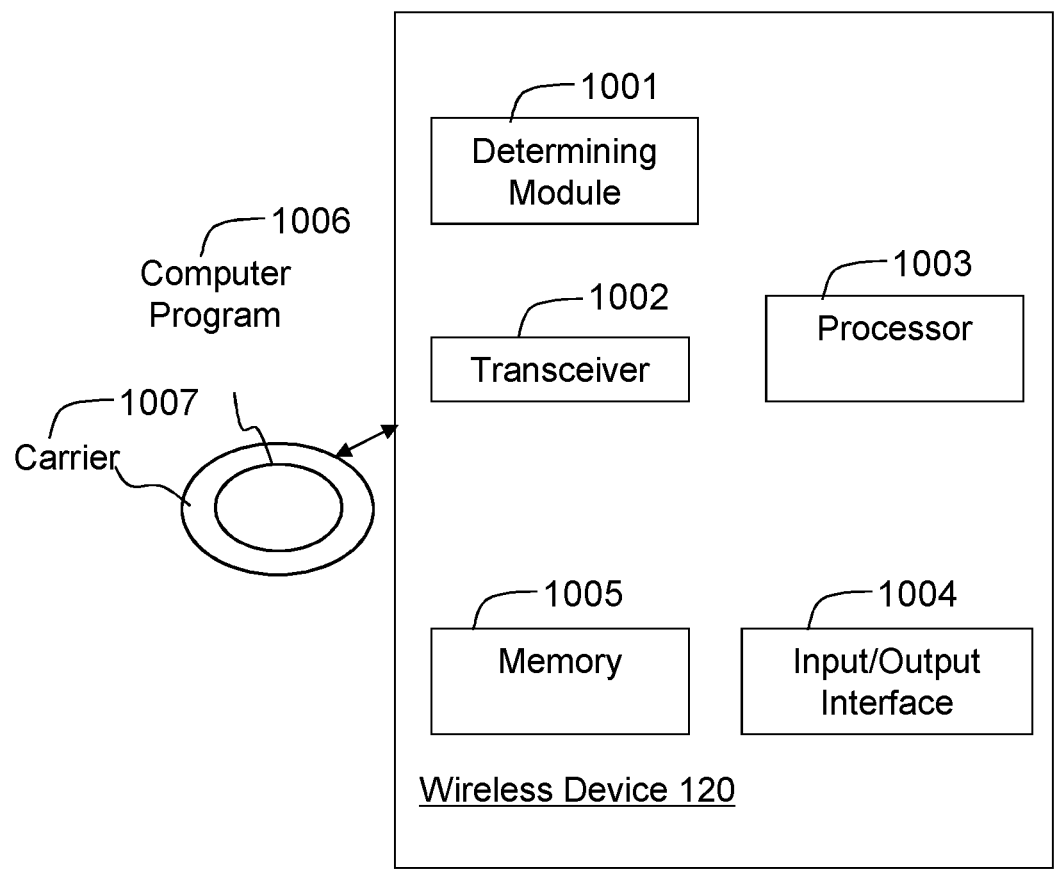
FIG. 10 is a schematic block diagram illustrating embodiments of a wireless device, according to embodiments herein.

To perform the method actions e.g., for reporting at least one measurement to the network node 130, e.g., a location server, the wireless device 120 may comprise the arrangement depicted in FIG. 10.

The wireless device 120 is configured to report at least one measurement to the network node 130. The wireless device 120 and the network node 130 are further configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 120, and will thus not be repeated here. For example, the measurement may be of a satellite signal.

The wireless device 120 may, e.g., comprise at least one of: a determining module 1001, a transceiver 1002, a code phase measuring module and a carrier phase measuring module, which are configured to perform the corresponding actions of the method described in FIGS. 4 and 9. The code phase measuring module and a carrier phase measuring module are not depicted in FIG. 10.

The wireless device 120 is configured to, e.g. by means of the determining module 1001 within the wireless device 120, configured to determine the extended format to be used for reporting, to the network node 130, the at least one of: the code phase measurement, the carrier phase measurement or the GNSS Signal ID. The extended format is configured to extend at least one of: the range or the resolution, of the existing format for reporting, to the network node 130, the at least one of: the code phase measurement, the carrier phase measurement or the GNSS Signal ID.

The wireless device 120 is configured to, e.g. by means of the determining module 1001 within the wireless device 120, or another module such as any of the code phase measuring module and a carrier phase measuring module, configured to send the measurement report comprising the at least one of: the code phase measurement, the carrier phase measurement or the GNSS Signal ID, to the network node 130, using the extended format configured to be determined.

In some embodiments, the extended format may be configured to comprise at least one IE in the GNSS-MeasurementList IE.

In some embodiments, the extended format may be configured to comprise at least one of: a) the IE configured to extend the range of the ADR measurement; b) the IE configured to indicate the pseudorange RMS error value for the ADR measurement; c) the IE configured to allow the ADR sign to have the full range of carrier phase measurement direction with respect to the existing format; d) the IE configured to allow the finer resolution of codephase measurement with respect to the existing format, or e) the IE configured to indicate the GNSS signal.

In some embodiments, at least one of: a) the IE configured to extend the range of the ADR measurement, b) the IE configured to indicate the pseudorange RMS error value for the ADR measurement, c) the IE configured to allow the ADR sign to have the full range of carrier phase measurement direction with respect to the existing format, d) the IE configured to allow the finer resolution of the codephase measurement with respect to the existing format, or e) the IE configured to indicate the GNSS signal, may be configured to be comprised in the ADR measurement IE.

The IE configured to extend the range of the ADR measurement may be configured to comprise at least one of: a) the added parameter, e.g., called adr-Ext-v15xy, with 29 bits, or b) the added integer value, e.g., called adr-Ext-v15xy, in the range of 0 to 15 configured to represent bits of the measurement.

The IE configured to allow the finer resolution of the codephase measurement with respect to the existing format may be configured to comprise at least one of: a) the parameter, e.g., called codePhase-Ext-r15, with 24 bits, or b) the added integer value, e.g., called codePhase-delta-r15, in the range of 0 to 7.

The IE configured to indicate the GNSS signal may be configured to comprise the additional field, e.g., called gnss-SignalID-Ext, with 32 bits.

The IE configured to indicate the pseudorange RMS error value for the ADR measurement may be configured to comprise an additional field, e.g., called adrRMSerror-r15.

The IE configured to allow the ADR sign to have the full range of carrier phase measurement direction with respect to the existing format may be configured to comprise an additional field, e.g., called adrSign.

The wireless device 120 may be further configured to, e.g. by means of the determining module 1001 within the wireless device 120, or another module such as any of the code phase measuring module and a carrier phase measuring module configured to provide, to the network node 130, the capabilities of reporting with the extended format for the at least one of: the code phase measurement, the carrier phase measurement or the GNSS Signal ID.

The wireless device 120 may be further configured to, e.g. by means of the determining module 1001 within the wireless device 120, or another module such as any of the code phase measuring module and a carrier phase measuring module configured to obtain the desired extended format from the network node 130, wherein to determine the extended format may be configured to be based on the desired extended format configured to be obtained.

In some embodiments, the desired extended format configured to be obtained may be configured to be based on the capabilities of reporting configured to be provided.

Those skilled in the art will also appreciate that the modules in the wireless device 120 described above may refer to a combination of analog and digital circuits, and/or one or more processors configured with software and/or firmware, e.g. stored in the wireless device 120, that when executed by the respective one or more processors such as the processors described above, perform as described above. One or more of these processors, as well as the other digital hardware, may be included in a single Application-Specific Integrated Circuitry ASIC), or several processors and various digital hardware may be distributed among several separate components, whether individually packaged or assembled into a system-on-a-chip SoC).

The embodiments herein may be implemented through a respective processor or one or more processors, such as the processor 1003 of a processing circuitry in the wireless device 120 depicted in FIG. 10, together with respective computer program code for performing the functions and actions of the embodiments herein. The program code mentioned above may also be provided as a computer program product, for instance in the form of a data carrier carrying computer program code for performing the embodiments herein when being loaded into the wireless device 120. One such carrier may be in the form of a CD ROM disc. It is however feasible with other data carriers such as a memory stick. The computer program code may furthermore be provided as pure program code on a server and downloaded to the wireless device 120.

Also, in some embodiments, the different modules described above with regards to the wireless device 120 may be implemented as one or more applications running on one or more processors such as the processor 1003.

The wireless device 120 may comprise an input and output interface 1004 configured to communicate with the network node 130, e.g., a location server. The input and output interface 1004 may comprise a wireless receiver, (not shown) and a wireless transmitter (not shown).

The wireless device 120 may further comprise a memory 1005 comprising one or more memory units. The memory 1005 comprises instructions executable by the processor 1003 in wireless device 120.

The memory 1005 is arranged to be used to store e.g. data, configurations, and applications to perform the methods herein when being executed in the wireless device 120.

In some embodiments, a respective computer program 1006 comprises instructions, which when executed by the respective at least one processor 1003, cause the at least one processor 1003 of the wireless device 120 to perform the actions above.

In some embodiments, a respective carrier 1007 comprises the respective computer program 1006, wherein the carrier may be one of an electronic signal, an optical signal, an electromagnetic signal, a magnetic signal, an electric signal, a radio signal, a microwave signal, or a computer-readable storage medium.

Figure 11:
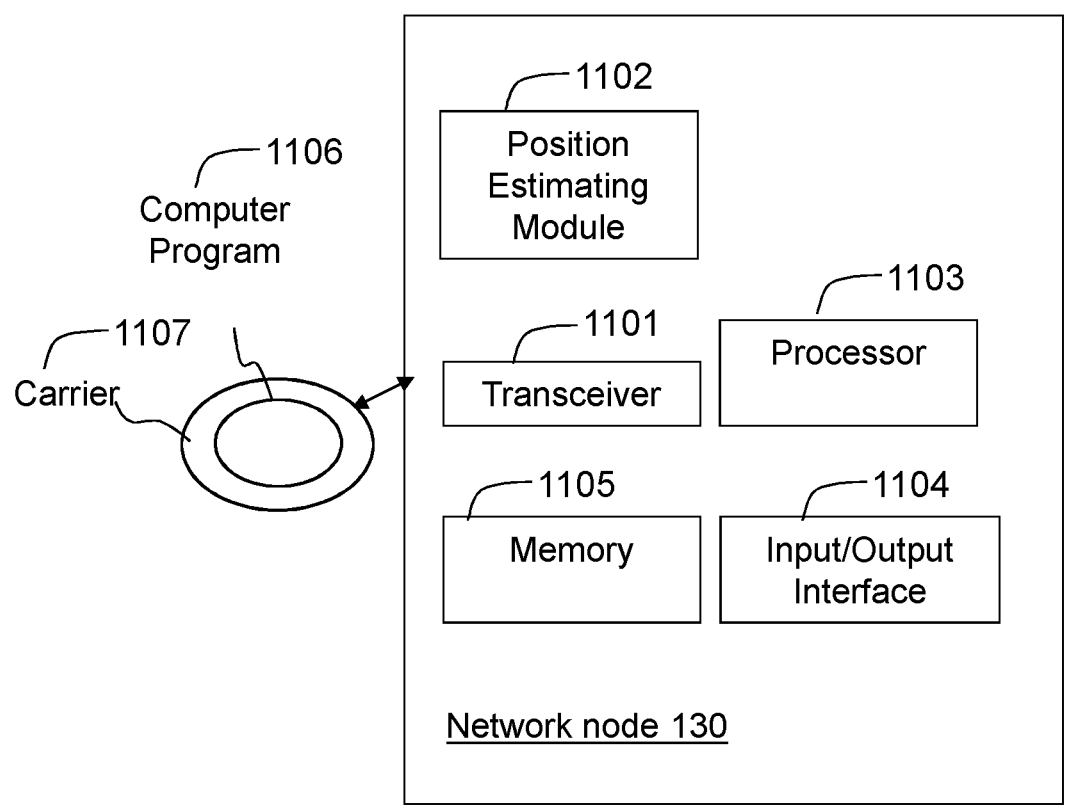
FIG. 11 is a schematic block diagram illustrating embodiments of a network node, according to embodiments herein.

To perform the method actions e.g., for handling the report of at least one measurement from the wireless device 120, such as for estimating the position of the wireless device 120, the network node 130 may comprise the arrangement depicted in FIG. 11.

The network node 130 is configured to handle the report of at least one measurement from the wireless device 120. The wireless device 120 and the network node 130 are further configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the network node 130, and will thus not be repeated here. For example, the measurement may be of a satellite signal.

The network node 130 may e.g. comprise at least one of: a transceiver 1101, and a position estimating module 1102, which are configured to perform the corresponding actions in the method described in FIGS. 7 and 9.

The network node 130 is configured to, e.g. by means of the position estimating module 1102 within the network node 130, or another module, configured to receive, from the wireless device 120, the measurement report comprising the at least one of: the code phase measurement, the carrier phase measurement or the GNSS Signal ID, using the extended format. The extended format is configured to extend at least one of: the range or the resolution, of the existing format for reporting, to the network node 130, the at least one of: the code phase measurement, the carrier phase measurement or the GNSS Signal ID. The extended format is configured to extend at least one of: the range or the resolution, of the existing format for reporting, to the network node 130, the at least one of: the code phase measurement, the carrier phase measurement or the GNSS Signal ID.

The network node 130 may be further configured to, e.g. the position estimating module 1102 within the network node 130 configured to estimate the position of the wireless device 120 based on the received measurement report using the extended format.

In some embodiments, the extended format may be configured to comprise at least one IE in the GNSS-MeasurementList IE.

In some embodiments, the extended format may be further configured to comprise at least one of: a) the IE configured to extend the range of the ADR measurement; b) the IE configured to indicate the pseudorange RMS error value for the ADR measurement; c) the IE configured to allow the ADR sign to have the full range of carrier phase measurement direction with respect to the existing format; d) the IE configured to allow the finer resolution of code-phase measurement with respect to the existing format, or e) the IE configured to indicate the GNSS signal.

In some embodiments, at least one of: a) the IE configured to extend the range of the ADR measurement, b) the IE configured to indicate the pseudorange RMS error value for the ADR measurement, c) the IE configured to allow the ADR sign to have the full range of carrier phase measurement direction with respect to the existing format, d) the IE configured to allow the finer resolution of the codephase measurement with respect to the existing format, or e) the IE configured to indicate the GNSS signal, may be configured to be comprised in the ADR measurement IE.

The IE configured to extend the range of the ADR measurement may be configured to comprise at least one of: a) the added parameter, e.g., called adr-Ext-v15xy, with 29 bits, or b) the added integer value, e.g., called adr-Ext-v15xy, in the range of 0 to 15 configured to represent bits of the measurement.

The IE configured to allow the finer resolution of the codephase measurement with respect to the existing format may be configured to comprise at least one of: a) the parameter, e.g., called codePhase-Ext-r15, with 24 bits, or b) the added integer value, e.g., called codePhase-delta-r15, in the range of 0 to 7.

The IE configured to indicate the GNSS signal may be configured to comprise an additional field, e.g., called gnss-SignalID-Ext, with 32 bits.

The IE configured to indicate the pseudorange RMS error value for the ADR measurement may be configured to comprise an additional field, e.g., called adrRMSerror-r15.

The IE configured to allow the ADR sign to have the full range of carrier phase measurement direction with respect to the existing format may be configured to comprise an additional field, e.g., called adrSign.

The network node 130 may be further configured to, e.g. by means of the position estimating module 1102, or another module, within the network node 130 configured to receive, from the wireless device 120, the capabilities of reporting with the extended format for the at least one of: the code phase measurement, the carrier phase measurement or the GNSS Signal ID.

The network node 130 may be further configured to, e.g. by means of the position estimating module 1102, or another module, within the network node 130 configured to indicate, to the wireless device 120, the extended format configured to be desired, for reporting the at least one of: the code phase measurement, the carrier phase measurement or the GNSS Signal ID.

In some embodiments, the desired extended format configured to be indicated may be configured to be based on the capabilities of reporting configured to be received.

The embodiments herein may be implemented through a respective processor or one or more processors, such as the processor 1103 of a processing circuitry in the network node 130 depicted in FIG. 11, together with respective computer program code for performing the functions and actions of the embodiments herein. The program code mentioned above may also be provided as a computer program product, for instance in the form of a data carrier carrying computer program code for performing the embodiments herein when being loaded into the network node 130. One such carrier may be in the form of a CD ROM disc. It is however feasible with other data carriers such as a memory stick. The computer program code may furthermore be provided as pure program code on a server and downloaded to the network node 130.

Those skilled in the art will also appreciate that the modules in the network node 130, described above may refer to a combination of analog and digital circuits, and/or one or more processors configured with software and/or firmware, e.g. stored in the location server 130, that when executed by the respective one or more processors such as the processors described above, perform as described above. One or more of these processors, as well as the other digital hardware, may be included in a single Application-Specific Integrated Circuitry ASIC), or several processors and various digital hardware may be distributed among several separate components, whether individually packaged or assembled into a system-on-a-chip SoC).

Also, in some embodiments, the different modules described above with regards to the network node 130 may be implemented as one or more applications running on one or more processors such as the processor 1103.

The network node 130 may comprise an input and output interface 1104 configured to communicate with the wireless device 120. The input and output interface 1104 may comprise a wireless receiver (not shown) and a wireless transmitter (not shown).

The network node 130 may further comprise a memory 1105 comprising one or more memory units. The memory 1105 comprises instructions executable by the processor 1103 in the network node 130.

The memory 1105 is arranged to be used to store e.g. data, configurations, and applications to perform the methods herein when being executed in the network node 130.

In some embodiments, a respective computer program 1106 comprises instructions, which when executed by the respective at least one processor 1103, cause the at least one processor 1103 of the network node 130 to perform the actions above.

In some embodiments, a respective carrier 1107 comprises the respective computer program 1106, wherein the carrier 1107 may be one of an electronic signal, an optical signal, an electromagnetic signal, a magnetic signal, an electric signal, a radio signal, a microwave signal, or a computer-readable storage medium.

The term processor, as used herein, may be understood as a hardware component, and may be considered to be equivalent to the term processing circuitry.

The expression "at least one of" followed by a list of alternatives using the "or" term, may be understood to mean that only one of the list of alternatives may apply, more than one of the list of alternatives may apply or all of the list of alternatives may apply.

While the term codephase may refer to a term as defined in e.g., as described e.g., in the 3GPP Technical Specification 36.305, v.14.1.0, any reference to codephase in embodiments herein may be understood to equally apply to a code phase indication of similar characteristics as may defined in another specification.

Further Extensions and Variations

Figure 12:
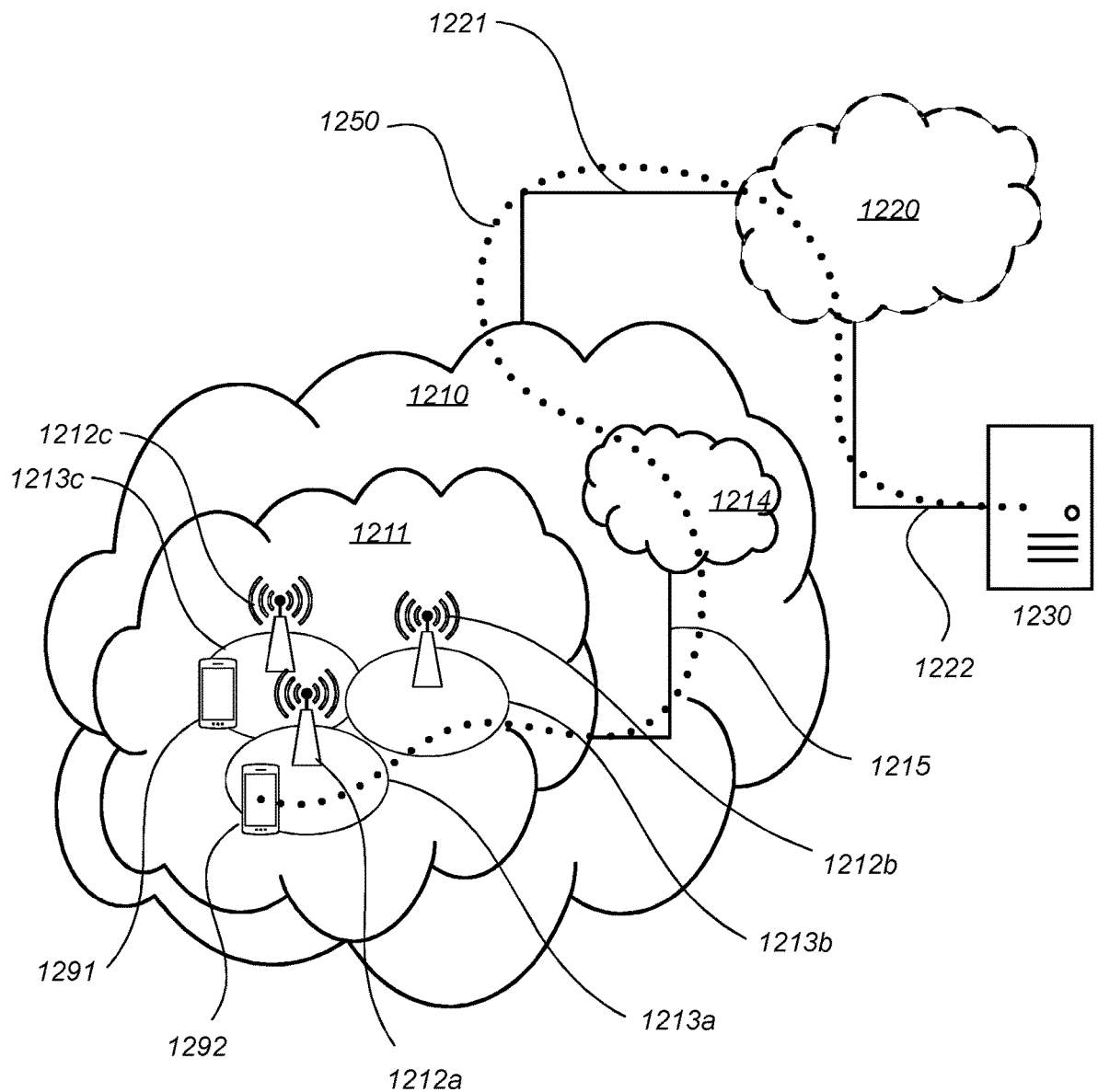
FIG. 12 is a schematic block diagram illustrating a telecommunication network connected via an intermediate network to a host computer, according to embodiments herein.

With reference to FIG. 12, in accordance with an embodiment, a communication system includes a telecommunication network 1210 such as the wireless communications network 100, e.g. a WLAN, such as a 3GPP-type cellular network, which comprises an access network 1211, such as a radio access network, and a core network 1214. The access network 1211 comprises a plurality of base stations 1212a, 1212b, 1212c, such as the eNodeB 110, access nodes, AP STAs NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. The core network 1214, may for example comprise the network node 130. A first user equipment (UE) e.g. the wireless device 120 such as a Non-AP STA 1291 located in coverage area 1213c is configured to wirelessly connect to, or be paged by, the corresponding base station 1212c. A second UE 1292 e.g., another wireless device such as the wireless device 120, such as a Non-AP STA in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between one of the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, a base station 1212 may not or need not be informed about the past routing of an incoming downlink communication with data originating from a host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In a communication system 1300, a host computer 1310 comprises hardware (HW) 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software (SW) 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
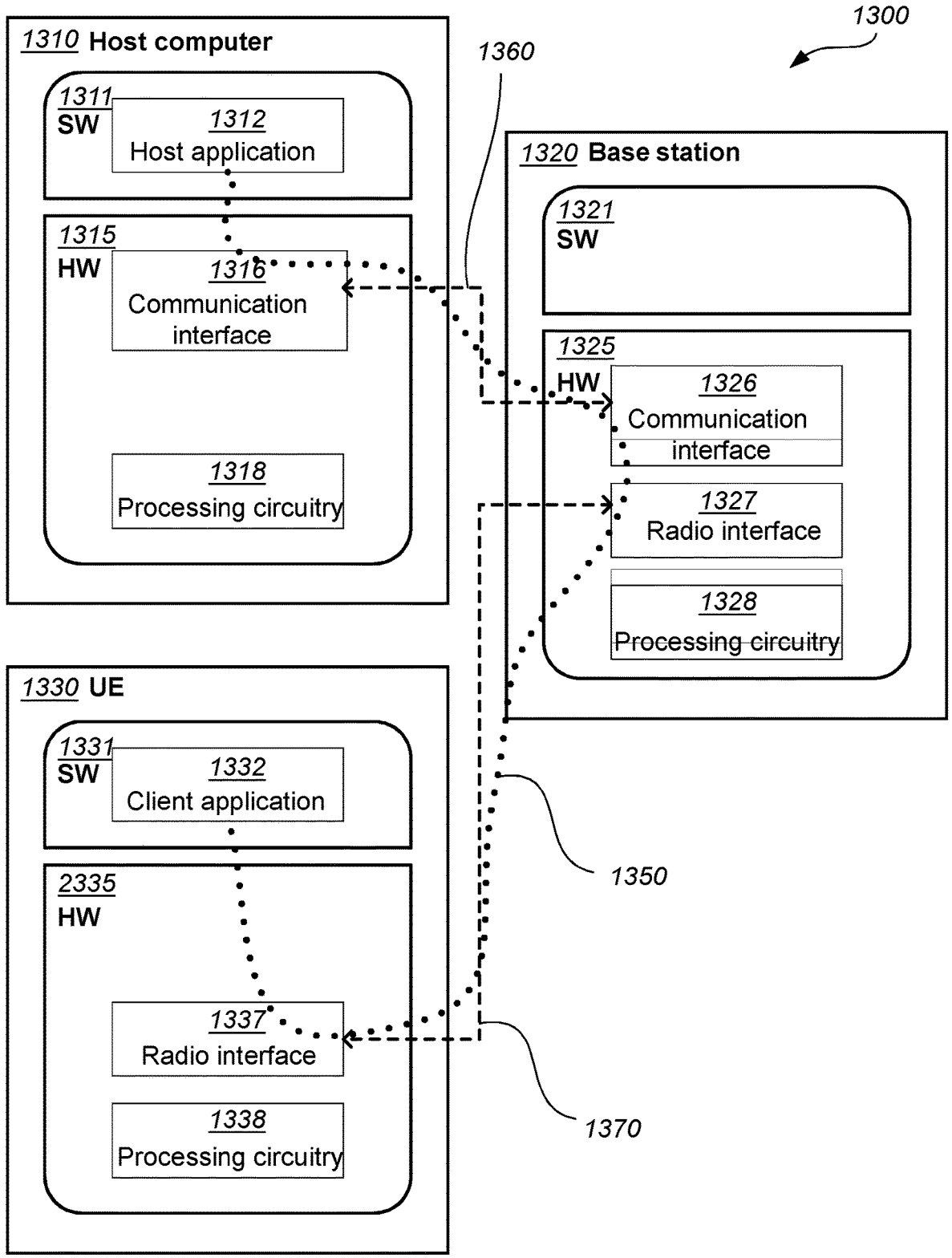
FIG. 13 is a generalized block diagram of a host computer communicating via a base station with a user equipment over a partially wireless connection, according to embodiments herein.

It is noted that the host computer 1310, base station 1320 and UE 1330 illustrated in FIG. 13 may be identical to the host computer 1230, one of the base stations 1212a, 1212b, 1212c and one of the UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the use equipment 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 1350 between the host computer 1310 and UE 1330, in response to variations in the measurement results. The measurement procedure and/or the network functionality for reconfiguring the OTT connection 1350 may be implemented in the software 1311 of the host computer 1310 or in the software 1331 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer's 1310 measurements of throughput, propagation times, latency and the like. The measurements may be implemented in that the software 1311, 1331 causes messages to be transmitted, in particular empty or 'dummy' messages, using the OTT connection 1350 while it monitors propagation times, errors etc.

Figure 14:
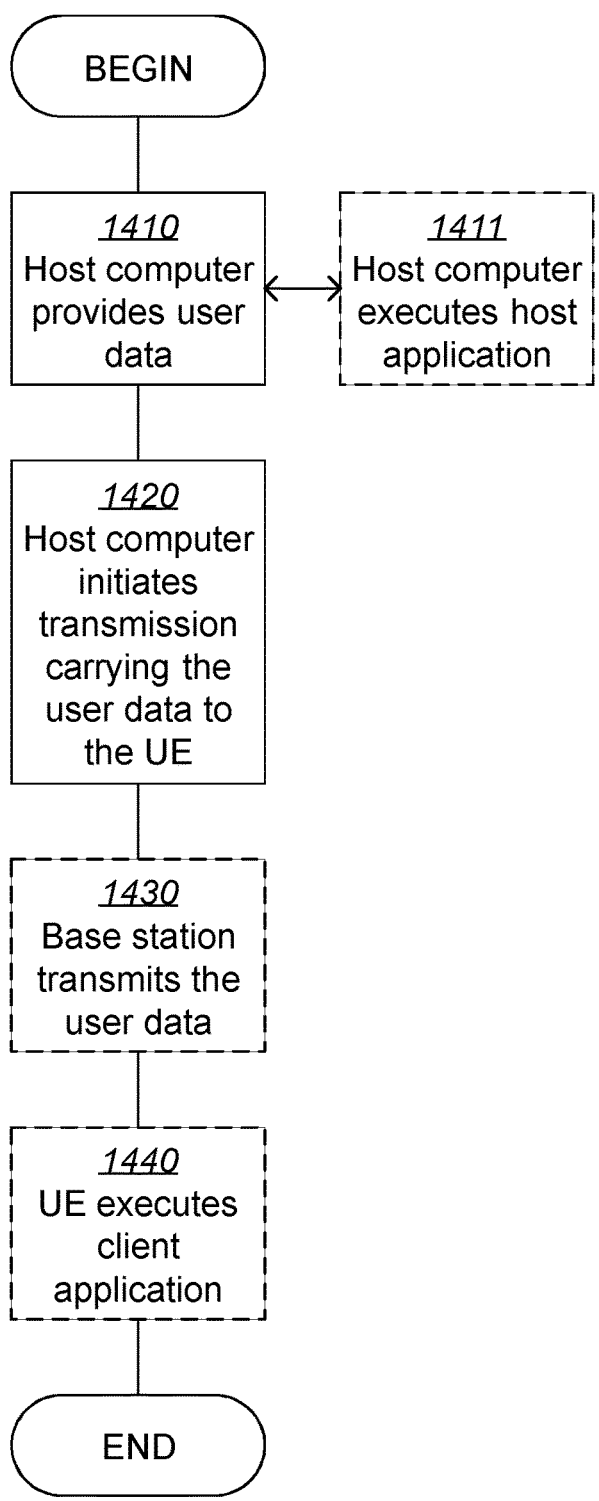
FIG. 14 is a flowchart depicting embodiments of a method in a communications system including a host computer, a base station and a user equipment, according to embodiments herein.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 12 and 13. For simplicity of the present disclosure, only drawing references to FIG. 14 will be included in this section. In a first action 1410 of the method, the host computer provides user data. In an optional subaction 1411 of the first action 1410, the host computer provides the user data by executing a host application. In a second action 1420, the host computer initiates a transmission carrying the user data to the UE. In an optional third action 1430, the base station transmits to the UE the user data which was carried in the transmission that the host computer initiated, in accordance with the teachings of the embodiments described throughout this disclosure. In an optional fourth action 1440, the UE executes a client application associated with the host application executed by the host computer.

Figure 15:
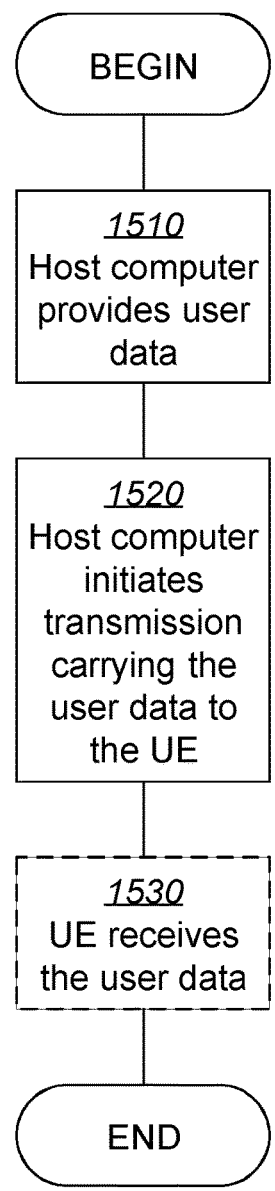
FIG. 15 is a flowchart depicting embodiments of a method in a communications system including a host computer, a base station and a user equipment, according to embodiments herein.

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 12 and 13. For simplicity of the present disclosure, only drawing references to FIG. 15 will be included in this section. In a first action 1510 of the method, the host computer provides user data. In an optional subaction (not shown) the host computer provides the user data by executing a host application. In a second action 1520, the host computer initiates a transmission carrying the user data to the UE. The transmission may pass via the base station, in accordance with the teachings of the embodiments described throughout this disclosure. In an optional third action 1530, the UE receives the user data carried in the transmission.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 12 and 13. For simplicity of the present disclosure, only drawing references to FIG. 16 will be included in this section. In an optional first action 1610 of the method, the UE receives input data provided by the host computer. Additionally or alternatively, in an optional second action 1620, the UE provides user data. In an optional subaction 1621 of the second action 1620, the UE provides the user data by executing a client application. In a further optional subaction 1611 of the first action 1610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 1630, transmission of the user data to the host computer. In a fourth action 1640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station such as a AP STA, and a UE such as a Non-AP STA which may be those described with reference to FIGS. 12 and 13. For simplicity of the present disclosure, only drawing references to FIG. 17 will be included in this section. In an optional first action 1710 of the method, in accordance with the teachings of the embodiments described throughout this disclosure, the base station receives user data from the UE. In an optional second action 1720, the base station initiates transmission of the received user data to the host computer. In a third action 1730, the host computer receives the user data carried in the transmission initiated by the base station.

Further Numbered Embodiments

1. A base station configured to communicate with a user equipment (UE), the base station comprising a radio interface and processing circuitry configured to perform one or more of the actions described herein as performed by the eNodeB 110.
5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the eNodeB 110.
6. The communication system of embodiment 5, further including the base station.
7. The communication system of embodiment 6, further including the UE, wherein the UE is configured to communicate with the base station.
8. The communication system of embodiment 7, wherein:
   the processing circuitry of the host computer is configured to execute a host application, thereby providing the user data; and
   the UE comprises processing circuitry configured to execute a client application associated with the host application.
11. A method implemented in a base station, comprising one or more of the actions described herein as performed by the eNodeB 110.
15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the eNodeB 110.
16. The method of embodiment 15, further comprising: at the base station, transmitting the user data.
17. The method of embodiment 16, wherein the user data is provided at the host computer by executing a host application, the method further comprising:
   at the UE, executing a client application associated with the host application.
21. A user equipment (UE) configured to communicate with a base station, the UE comprising a radio interface and processing circuitry configured to perform one or more of the actions described herein as performed by the wireless device 120.
25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the wireless device 120.
26. The communication system of embodiment 25, further including the UE.
27. The communication system of embodiment 26, wherein the cellular network further includes a base station configured to communicate with the UE.
28. The communication system of embodiment 26 or 27, wherein:
   the processing circuitry of the host computer is configured to execute a host application, thereby providing the user data; and
   the UE's processing circuitry is configured to execute a client application associated with the host application.
31. A method implemented in a user equipment (UE), comprising one or more of the actions described herein as performed by the wireless device 120.
35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by the wireless device 120.
36. The method of embodiment 35, further comprising:
   at the UE, receiving the user data from the base station.
41. A user equipment (UE) configured to communicate with a base station, the UE comprising a radio interface and processing circuitry configured to perform one or more of the actions described herein as performed by the wireless device 120.
45. A communication system including a host computer comprising:
   a communication interface configured to receive user data originating from a transmission from a user equipment (UE) to a base station,
   wherein the UE comprises a radio interface and processing circuitry, the UE's processing circuitry configured to: perform one or more of the actions described herein as performed by the wireless device 120.
46. The communication system of embodiment 45, further including the UE.
47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
  the processing circuitry of the host computer is configured to execute a host application; and
  the UE's processing circuitry is configured to execute a client application associated with the host application, thereby providing the user data.

49. The communication system of embodiment 46 or 47, wherein:
  the processing circuitry of the host computer is configured to execute a host application, thereby providing request data; and
  the UE's processing circuitry is configured to execute a client application associated with the host application, thereby providing the user data in response to the request data.

51. A method implemented in a user equipment (UE), comprising one or more of the actions described herein as performed by the wireless device 120.

52. The method of embodiment 51, further comprising:
  providing user data; and
  forwarding the user data to a host computer via the transmission to the base station.

55. A method implemented in a communication system including a host computer, a base station and a user equipment (UE), the method comprising:
  at the host computer, receiving user data transmitted to the base station from the UE, wherein the UE performs one or more of the actions described herein as performed by the wireless device 120.

56. The method of embodiment 55, further comprising:
  at the UE, providing the user data to the base station.

57. The method of embodiment 56, further comprising:
  at the UE, executing a client application, thereby providing the user data to be transmitted; and
  at the host computer, executing a host application associated with the client application.

58. The method of embodiment 56, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

61. A base station configured to communicate with a user equipment (UE), the base station comprising a radio interface and processing circuitry configured to perform one or more of the actions described herein as performed by the eNodeB 110.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the eNodeB 110.

66. The communication system of embodiment 65, further including the base station.

67. The communication system of embodiment 66, further including the UE, wherein the UE is configured to communicate with the base station.

68. The communication system of embodiment 67, wherein:
  the processing circuitry of the host computer is configured to execute a host application;
  the UE is configured to execute a client application associated with the host application, thereby providing the user data to be received by the host computer.

71. A method implemented in a base station, comprising one or more of the actions described herein as performed by the eNodeB 110.

75. A method implemented in a communication system including a host computer, a base station and a user equipment (UE), the method comprising:
  at the host computer, receiving, from the base station, user data originating from a transmission which the base station has received from the UE, wherein the UE performs one or more of the actions described herein as performed by the wireless device 120.

76. The method of embodiment 75, further comprising:
  at the base station, receiving the user data from the UE.

77. The method of embodiment 76, further comprising:
  at the base station, initiating a transmission of the received user data to the host computer.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviation Explanation

E-SMLC Evolved-Serving Mobile Location Centre
GNSS Global Navigation System
RTK Real Time Kinematic
RMS Root Mean Square

The invention claimed is:

1. A method, performed by a wireless device, for reporting at least one measurement to a network node, the wireless device and the network node operating in a wireless communications network, the method comprising:
  determining an extended format to be used for reporting, to the network node, at least one of a code phase measurement, a carrier phase measurement, and a Global Navigation Satellite System (GNSS) Signal Identifier (ID), wherein:
    the extended format extends an existing format for reporting the at least one of the code phase measurement, the carrier phase measurement, and the GNSS Signal ID, and
    the extended format extends at least one of a range and a resolution of the existing format; and
  sending, to the network node using the determined extended format, a measurement report including the at least one of the code phase measurement, the carrier phase measurement, and the GNSS Signal ID.

2. The method according to claim 1, wherein the extended format comprises at least one information element (IE) in a GNSS-MeasurementList IE.

3. The method according to claim 1, wherein the extended format comprises at least one of the following:
  an information element (IE) extending a range of an Accumulated Delta-Range (ADR) measurement,
  an IE indicating a pseudorange Root Mean Square (RMS) error value for an ADR measurement,
  an IE allowing an ADR sign to have a full range of carrier phase measurement direction with respect to the existing format,
  an IE allowing a finer resolution of code phase measurement with respect to the existing format, and
  an IE indicating a GNSS signal.

4. The method according to claim 3, wherein at least one of the following is included in an ADR measurement IE:
the IE extending the range of the ADR measurement,
the IE indicating the pseudorange RMS error value for the ADR measurement,
the IE allowing the ADR sign to have the full range of carrier phase measurement direction with respect to the existing format,
the IE allowing the finer resolution of the code phase measurement with respect to the existing format, and
the IE indicating the GNSS signal.

5. The method according to claim 3, wherein the IE extending the range of the ADR measurement includes at least one of the following:
an added parameter with 29 bits, and
an added integer value in the range of 0 to 15 representing bits of the measurement.

6. The method according to claim 3, wherein the IE allowing the finer resolution of the code phase measurement with respect to the existing format includes at least one of the following:
a parameter with 24 bits, and
an added integer value in the range of 0 to 7.

7. The method according to claim 3, wherein the IE indicating the GNSS signal includes an additional field with 32 bits.

8. The method according to claim 3, wherein at least one of the following includes an additional field:
the IE indicating the pseudorange RMS error value for the ADR measurement, and
the IE allowing the ADR sign to have the full range of carrier phase measurement direction with respect to the existing format.

9. The method according to claim 1, further comprising providing, to the network node, an indication of the wireless device's capabilities of reporting the at least one of the code phase measurement, the carrier phase measurement, and the GNSS Signal ID using the extended format.

10. A method, performed by a network node, for handling a report of at least one measurement from a wireless device, the wireless device and the network node operating in a wireless communications network, the method comprising:
receiving, from the wireless device, a measurement report comprising at least one of a code phase measurement, a carrier phase measurement, and a Global Navigation Satellite System (GNSS) Signal Identifier (ID), wherein:
the measurement report uses an extended format that extends an existing format for reporting the at least one of the code phase measurement, the carrier phase measurement, and the GNSS Signal ID, and
the extended format extends at least one of a range and a resolution of the existing format.

11. The method according to claim 10, further comprising estimating a position of the wireless device based on the received measurement report using the extended format.

12. The method according to claim 10, the extended format comprises at least one information element (IE) in a GNSS-MeasurementList IE.

13. The method according to claim 10, wherein the extended format comprises at least one of the following:
an information element (IE) extending a range of an Accumulated Delta-Range (ADR) measurement,
an IE indicating a pseudorange Root Mean Square (RMS) error value for an ADR measurement,
an IE allowing an ADR sign to have a full range of carrier phase measurement direction with respect to the existing format,
an IE allowing a finer resolution of code phase measurement with respect to the existing format, and
an IE indicating a GNSS signal.

14. The method according to claim 13, wherein at least one of the following is included in an ADR measurement IE:
the IE extending the range of the ADR measurement,
the IE indicating the pseudorange RMS error value for the ADR measurement,
the IE allowing the ADR sign to have the full range of carrier phase measurement direction with respect to the existing format,
the IE allowing the finer resolution of the code phase measurement with respect to the existing format, and
the IE indicating the GNSS signal.

15. The method according to claim 10, further comprising receiving, from the wireless device, an indication of the wireless device's capabilities of reporting the at least one of the code phase measurement, the carrier phase measurement, and the GNSS Signal ID using the extended format.

16. A wireless device configured to report at least one measurement to a network node, the wireless device and the network node being configured to operate in a wireless communications network, the wireless device comprising:
one or more processors; and
a computer-readable medium storing computer-executable instructions that, when executed by the one or more processors, configure the wireless device to:
determine an extended format to be used for reporting, to the network node, at least one of a code phase measurement, a carrier phase measurement, and a Global Navigation Satellite System (GNSS) Signal Identifier (ID), wherein:
the extended format extends an existing format for reporting the at least one of the code phase measurement, the carrier phase measurement, and the GNSS Signal ID, and
the extended format extends at least one of a range and a resolution of the existing format; and
send, to the network node using the determined extended format, a measurement report including the at least one of the code phase measurement, the carrier phase measurement, and the GNSS Signal ID.

17. The wireless device according to claim 16, the extended format comprises at least one information element (IE) in a GNSS-MeasurementList IE.

18. The wireless device according to claim 16, wherein the extended format comprises at least one of the following:
an information element (IE) extending a range of an Accumulated Delta-Range (ADR) measurement,
an IE indicating a pseudorange Root Mean Square (RMS) error value for an ADR measurement,
an IE allowing an ADR sign to have a full range of carrier phase measurement direction with respect to the existing format,
an IE allowing a finer resolution of code phase measurement with respect to the existing format, and
an IE indicating a GNSS signal.

19. The wireless device according to claim 18, wherein at least one of the following is included in an ADR measurement IE:
the IE extending the range of the ADR measurement,
the IE indicating the pseudorange RMS error value for the ADR measurement, the IE allowing the ADR sign to have the full range of carrier phase measurement direction with respect to the existing format, the IE allowing the finer resolution of the code phase measurement with respect to the existing format, and the IE indicating the GNSS signal.

20. A network node configured to handle a report of at least one measurement from a wireless device, the wireless device and the network node being configured to operate in a wireless communications network, the network node comprising:

one or more processors; and a computer-readable medium storing computer-executable instructions that, when executed by the one or more processors, configure the wireless device to:

receive, from the wireless device, a measurement report comprising at least one of a code phase measurement, a carrier phase measurement, and a Global Navigation Satellite System (GNSS) Signal Identifier (ID), wherein:

the measurement report uses an extended format that extends an existing format for reporting the at least one of the code phase measurement, the carrier phase measurement, and the GNSS Signal ID, and the extended format extends at least one of a range and a resolution of the existing format.

21. The network node according to claim 20, wherein the instructions, when executed by the one or more processors, further configure the network node to estimate a position of the wireless device based on the received measurement report using the extended format.

22. The network node according to claim 20, the extended format comprises at least one information element (IE) in a GNSS-MeasurementList IE.

* * * * *